United States Patent
Bleyer et al.

(10) Patent No.: US 11,032,530 B1
(45) Date of Patent: Jun. 8, 2021

(54) GRADUAL FALLBACK FROM FULL PARALLAX CORRECTION TO PLANAR REPROJECTION

(71) Applicant: MICROSOFT TECHNOLOGY LICENSING, LLC, Redmond, WA (US)

(72) Inventors: Michael Bleyer, Seattle, WA (US); Christopher Douglas Edmonds, Carnation, WA (US); Raymond Kirk Price, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/875,269

(22) Filed: May 15, 2020

(51) Int. Cl.
*H04N 13/128* (2018.01)
*H04N 13/332* (2018.01)
*H04N 13/271* (2018.01)
*H04N 13/239* (2018.01)
*H04N 13/00* (2018.01)

(52) U.S. Cl.
CPC ......... *H04N 13/128* (2018.05); *H04N 13/239* (2018.05); *H04N 13/271* (2018.05); *H04N 13/332* (2018.05); *H04N 2013/0081* (2013.01)

(58) Field of Classification Search
CPC ................... H04N 2013/0081; H04N 13/128
USPC ........................................................ 348/43
See application file for complete search history.

(56) References Cited

U.S. PATENT DOCUMENTS

| 2013/0229485 A1* | 9/2013 | Rusanovskyy ........ H04N 19/52 348/43 |
| 2019/0258058 A1* | 8/2019 | Fortin-Desch nes ........ G02B 27/017 |
| 2020/0284883 A1* | 9/2020 | Ferreira ................ G01S 7/4816 |

\* cited by examiner

*Primary Examiner* — Amir Shahnami
(74) *Attorney, Agent, or Firm* — Workman Nydegger

(57) ABSTRACT

Improved techniques for generating depth maps are disclosed. A stereo pair of images of an environment is accessed. This stereo pair of images includes first and second texture images. A signal to noise ratio (SNR) is identified within one or both of those images. Based on the SNR, which may be based on the texture image quality or the quality of the stereo match, there is a process of selectively computing and imposing a smoothness penalty against a smoothness term of a cost function used by a stereo depth matching algorithm. A depth map is generated by using the stereo depth matching algorithm to perform stereo depth matching on the stereo pair of images. The stereo depth matching algorithm performs the stereo depth matching using the smoothness penalty.

20 Claims, 20 Drawing Sheets

Parallax Problem
100

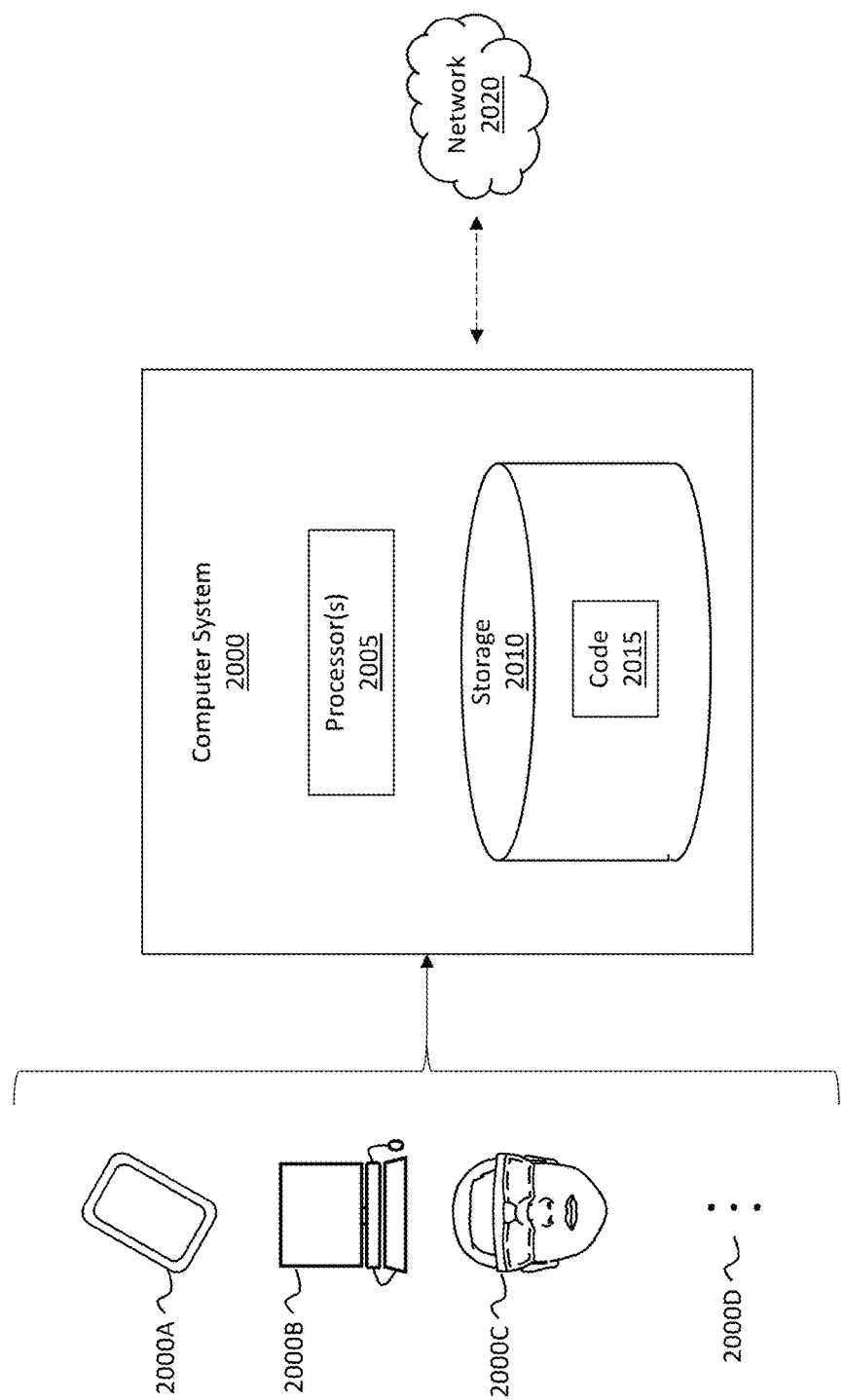

GRADUAL FALLBACK FROM FULL PARALLAX CORRECTION TO PLANAR REPROJECTION

BACKGROUND

Mixed-reality (MR) systems, including virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

Many MR systems include a depth detection system (e.g., time of flight camera, rangefinder, stereoscopic depth cameras, etc.). A depth detection system provides depth information about the real-world environment surrounding the MR system to enable the MR system to accurately present MR content (e.g., holograms) with respect to real-world objects or other virtual objects. As an illustrative example, a depth detection system is able to obtain depth information for a real-world table positioned within a real-world environment. The MR system is then able to render and display a virtual figurine accurately positioned on the real-world table such that the user perceives the virtual figurine as though it were part of the user's real-world environment.

A MR system may also employ cameras of a depth detection system, such as stereo cameras, for other purposes. For example, a MR system may utilize images obtained by stereo cameras to provide a passthrough view of the user's environment to the user. A passthrough view can aid users in avoiding disorientation and/or safety hazards when transitioning into and/or navigating within a MR environment.

Furthermore, in some instances, a MR system includes stereo cameras of various modalities to provide views of a user's environment that enhance the user's understanding of his/her real-world environment. For example, a MR system that includes long wavelength thermal imaging cameras may allow a user (e.g., a first responder) to see through smoke, haze, fog, and/or dust. In another example, a MR system that includes low light imaging cameras may allow a user (e.g., a first responder) to see in dark environments.

A MR system can present views captured by stereo cameras to users in a variety of ways. The process of using images captured by world-facing cameras to provide three-dimensional views of a real-world environment to a user creates many challenges, however.

Some of these challenges occur as a result of the stereo cameras being physically separated from the physical positioning of the user's eyes. If the camera's images were directly provided to the user as passthrough images, those images would cause the user to perceive the real-world environment from the camera's perspective as opposed to the user's own perspective. For example, a vertical offset between the positioning of the user's eyes and the positioning of the stereo cameras can cause the user to perceive real-world objects as vertically offset from their true positions with respect to the user. In another example, a difference in the spacing between the user's eyes and the spacing between the stereo cameras can cause the user to perceive real-world objects with incorrect depth.

The difference in perception between how the cameras observe an object and how a user's eyes observe an object is often referred to as the "parallax problem" or "parallax error." FIG. 1 illustrates a conceptual representation of the parallax problem 100 in which cameras 105A and 105B (i.e. a stereo pair of camera) are physically separated from a user's eyes 110A and 110B. Sensor region 115A conceptually depicts the image sensing regions of camera 105A (e.g., the pixel grid) and the user's eye 110A (e.g., the retina). Similarly, sensor region 115B conceptually depicts the image sensing regions of camera 105B and the user's eye 110B.

The cameras 105A and 105B and the user's eyes 110A and 110B perceive an object 120, as indicated in FIG. 1 by the lines extending from the object 120 to the cameras 105A and 105B and the user's eyes 110A and 110B, respectively. FIG. 1, for example, illustrates that the cameras 105A and 105B perceive the object 120 at different positions on their respective sensor regions 115A and 115B. Similarly, FIG. 1 shows that the user's eyes 110A and 110B perceive the object 120 at different positions on their respective sensor regions 115A and 115B. Furthermore, the user's eye 110A perceives the object 120 at a different position on sensor region 115A than camera 105A, and the user's eye 110B perceives the object 120 at a different position on sensor region 115B than camera 105B.

Some approaches to correct for the parallax problem involve performing a camera reprojection from the perspective of the stereo cameras to the perspectives of the user's eyes. For instance, some approaches involve performing a calibration step to determine the differences in physical positioning between the stereo cameras and the user's eyes. Then, after capturing a timestamped pair of stereo images with the stereo cameras, a step of calculating depth information (e.g., a depth map) based on the stereo pair of images can be performed (e.g., by performing stereo matching). Subsequently, a system can reproject the stereo images using the calculated depth information so that perspectives embodied within those stereo images correspond to the perspectives of the user's left and right eyes.

However, calculating and processing depth information based on a stereo pair of images, particularly when addressing the parallax problem, is associated with many challenges. For instance, significant hurdles arise when the signal to noise ratio (SNR) of the images (i.e. the stereo pair of images, also referred to herein as "texture" images) indicates that the images are low in quality. Poor quality texture images typically means that the resulting depth map will also be low in quality because the SNR skews the accuracy of the pixel's depth disparities. Low quality texture images produce low quality depth maps. Because MR systems are used in a wide variety of environments, including low light environments, it is often the case that low-quality texture images are produced. As a consequence, there is a substantial need to improve how depth maps are created to improve parallax correction operations, especially when low quality texture images are generated. Accordingly, for at least the foregoing reasons, there is an ongoing need and desire for improved techniques and systems for calculating and processing depth information, particularly for systems that resolve parallax problems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., hardware storage devices, wearable devices, etc.), and methods configured to facilitate improved depth map generation even in the presence of reduced image quality by computing and imposing a smoothness penalty against a smoothness term of a cost function.

In some embodiments, the cost function also includes a data term and is used when a stereo depth matching algorithm generates a depth map. The computing process is based on a detected signal to noise ratio (SNR) of texture images used by the stereo depth matching algorithm to generate the depth map. To achieve these benefits, a stereo pair of images of an environment is accessed. This stereo pair of images comprise a first texture image and a second texture image. A SNR is identified within one or both of the first texture image and the second texture image for stereo matching. Based on the identified SNR, there is a process of selectively computing a smoothness penalty to be imposed against a smoothness term of the cost function that is used by the stereo depth matching algorithm. A depth map is generated by using the stereo depth matching algorithm to perform stereo depth matching on the stereo pair of images. The stereo depth matching algorithm performs the stereo depth matching via use of the selectively computed smoothness penalty.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 20 illustrates an example computer system or architecture that is configured to perform any of the disclosed operations.

DETAILED DESCRIPTION

Figure 1:
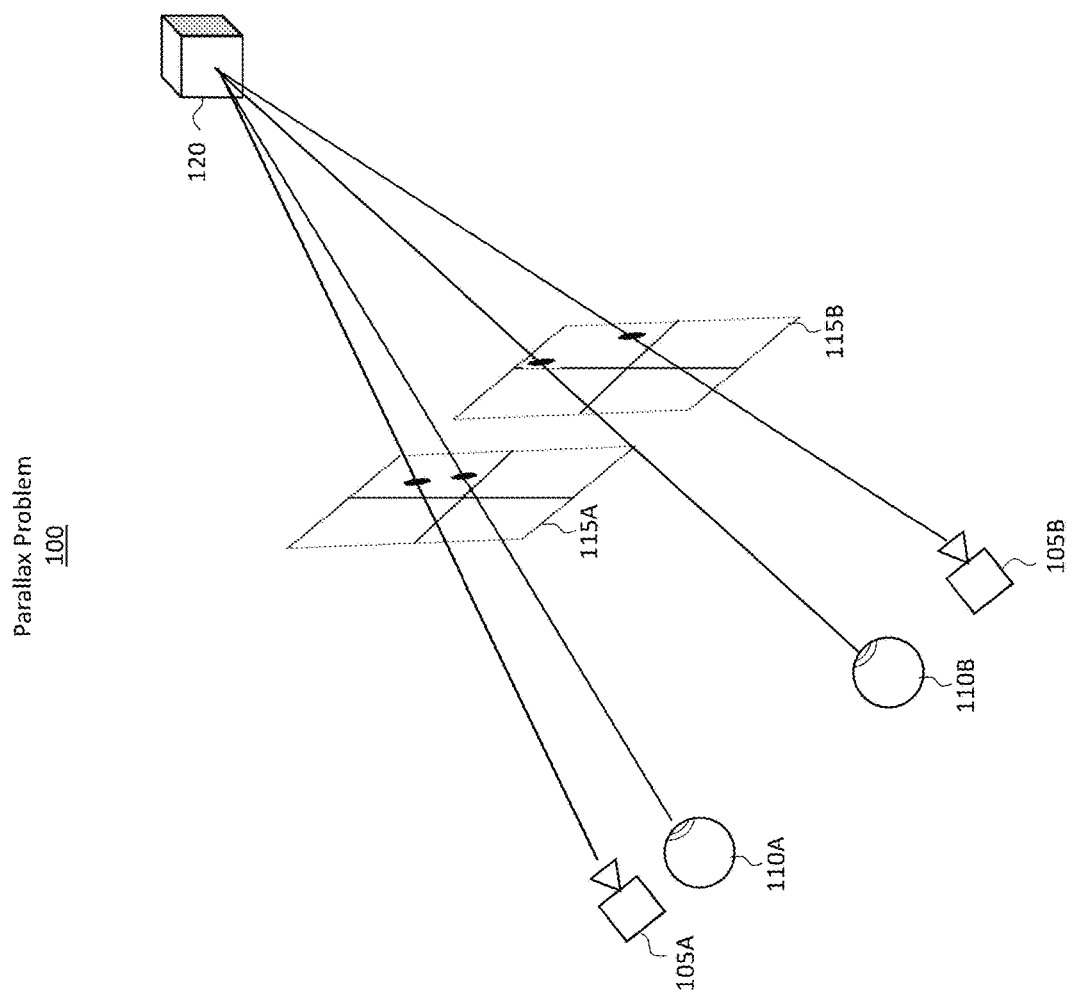
FIG. 1 illustrates an example of the parallax problem that occurs when cameras have fields of view different than the fields of view of a user's eyes.

Embodiments disclosed herein relate to systems, devices (e.g., hardware storage devices, wearable devices, etc.), and methods configured to facilitate improved depth map generation by computing and imposing a smoothness penalty against a smoothness term of a cost function based on a signal to noise ratio (SNR). Doing so operates to flatten the resulting depth map, especially for areas that otherwise might have had inaccurate depths. As used herein, the term SNR should be viewed and interpreted broadly. In some cases, the SNR is related to the SNR detected or computed within one or more texture images. In some cases, the SNR may also be based on the quality of the stereo depth matching that is performed. Accordingly, SNR should be viewed in a broad sense and not limited to any one implementation. Similarly, as will be discussed in more detail later, the "smoothness term" of the cost function states that neighboring pixels are to have the same or sufficiently similar disparity values. If that is not the case, then a smoothness penalty is applied, which penalty increases the cost of the cost function.

In some embodiments, a stereo pair of images of an environment is accessed. This stereo pair of images includes first and second texture images. A SNR is identified within one or both of those images. Based on the SNR, the embodiments selectively compute a smoothness penalty to be imposed against a smoothness term of the cost function used by the stereo depth matching algorithm. A depth map is generated by using the stereo depth matching algorithm to perform stereo depth matching on the stereo pair of images. The stereo depth matching algorithm performs the stereo depth matching using the selected smoothness penalty.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments relate to using an adaptive way to provide depth-based reprojection based on camera imagery that intelligently adjusts the level of stereo matching. This intelligent adjustment is based on the SNR present in one or more of the texture images. As the image quality is reduced (as reflected by the SNR), the embodiments modify the smoothness penalty of the stereo matching algorithm (which may include a patch match, a semi-global matching (SGM) method, or any other stereo matching algorithm) to allow for a depth image with increased smoothness and flatness.

By reducing the smoothness penalty, the embodiments are able to use and process stereo images even when those stereo images have increased signal to noise ratios. Although the processing is performed at the expense of reduced contours, geometries, and other features in the stereo matched depth map, the benefits achieved by performing the disclosed operations far outweigh any such reductions in depth map quality. That is, by practicing the disclosed principles, the embodiments beneficially generate usable depth maps whereas previous attempts often resulted in unusable depth maps. Accordingly, the disclosed embodiments substantially improve the technical field by enabling the generation of workable depth maps based on texture images having poor image quality, as potentially reflected by a SNR.

By way of additional clarification, the disclosed embodiments beneficially address the issue of poor SNR that are often found in low light cameras (though other cameras may also have poor SNR). Even though low light cameras have large pixels (roughly 10 um×10 um), very low read noise (~1.5 electrons), and low dark current (40-400 nA/second of integration time), the SNR of these sensors can be poor under certain circumstances. One reason for this is when poor ambient light conditions exist. For instance, the low ambient light level found in starlight often causes poor SNR in the texture images produced by the low light cameras. In environments with poor ambient light conditions, it is often the case that only about 2-5 photons are incident on a pixel over an integration time of ~11 ms (corresponding to a frame rate of 90 Hz). The disclosed embodiments beneficially provide an adaptive way to perform depth-based reprojection based on camera imagery that intelligently adjusts the level of stereo matching based on SNR, which is influenced by the ambient light levels.

It should be noted how the disclosed principles may be practiced using any type of camera, including standard PV cameras as well thermal cameras, and others as discussed throughout this disclosure. Indeed, small pixel cameras used in stereo matching also suffer from the same issues above. In situations where the MR scene has a very low temperature profile (e.g., an indoor cinder block building, a cave, or a very uniform temperature indoor environment), the SNR of the thermal camera can also be very poor. In those cases, when attempting to perform stereo matching on thermal camera images, the SNR will also be low. Consequently, the disclosed principles may also be practiced using thermal images produced by thermal cameras.

Accordingly, as the SNR (e.g., of any type of camera system, including visible light cameras, low light cameras, thermal cameras, etc.) is reduced, the embodiments fall back from a full resolution depth map to a planar depth map. The gradual transition from a full depth map to (in a most extreme case) a single plane depth map can be accomplished by adjusting the smoothness penalty of the stereo matcher. The resulting depth map is flatter when operating in a low SNR environment and better matches the real-world scene, resulting in an improved depth map in scenarios where the SNR is poor or below a threshold SNR level. As the image quality is reduced as a result of the SNR, the embodiments beneficially modify the smoothness penalty of the stereo matching algorithm to allow for a depth map with increased smoothness or flatness. By modifying the smoothness penalty, the embodiments are able to use and process stereo images, even when those images have increased signal to noise ratios.

Example MR Systems and HMDs

Figure 2:
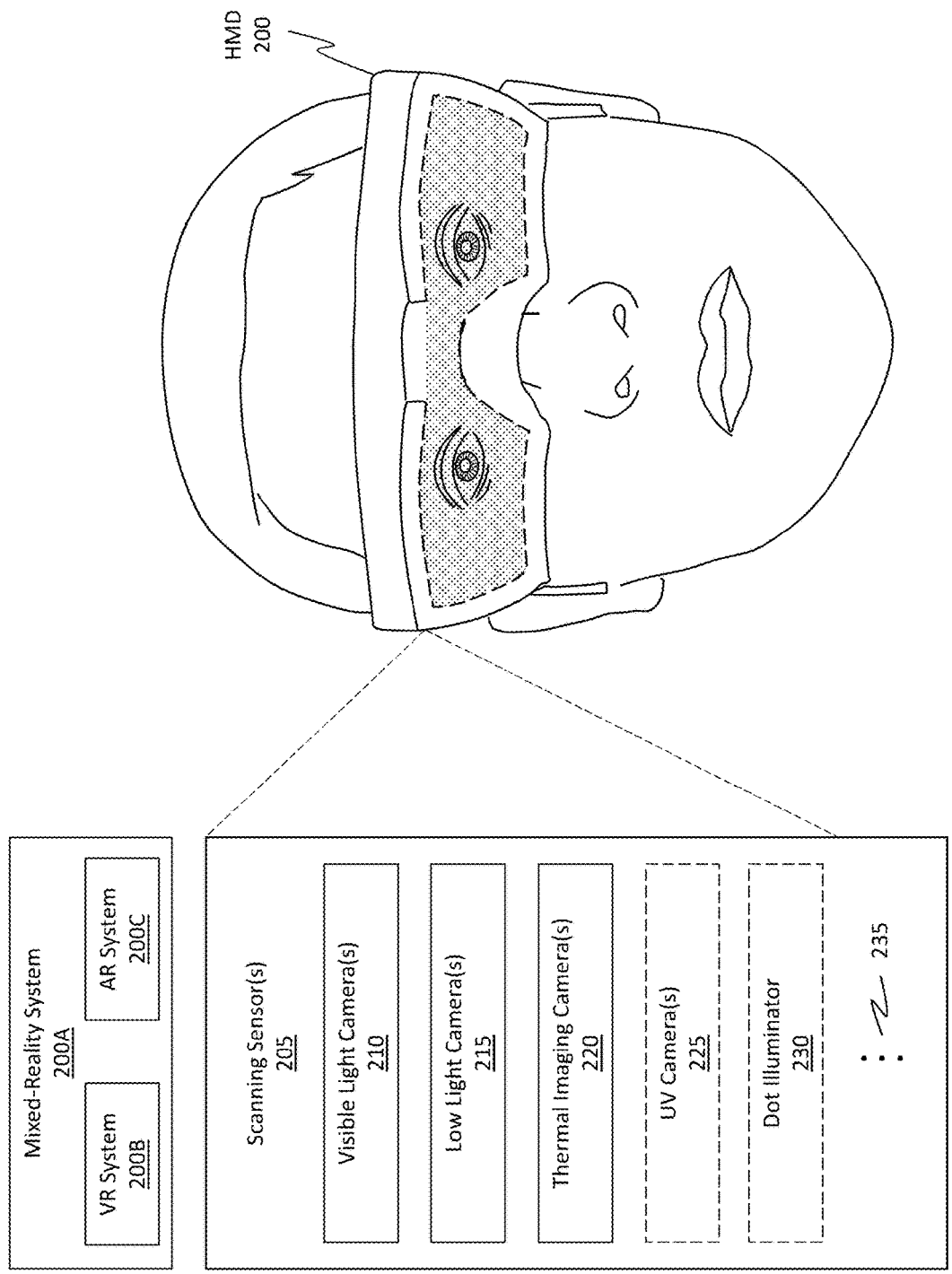
FIG. 2 illustrates an example HMD that may be used to perform one or more of the disclosed operations.

Attention will now be directed to FIG. 2, which illustrates an example of a head-mounted device (HMD) 200. HMD 200 can be any type of MR system 200A, including a VR system 200B or an AR system 200C. It should be noted that while a substantial portion of this disclosure is focused on the use of an HMD, the embodiments are not limited to being practiced using only an HMD. That is, any type of scanning system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

HMD 200 is shown as including scanning sensor(s) 205 (i.e. a type of scanning or camera system), and HMD 200 can use the scanning sensor(s) 205 to scan environments, map environments, capture environmental data, and/or generate any kind of images of the environment (e.g., by generating a 3D representation of the environment or by generating a "passthrough" visualization). Scanning sensor (s) 205 may comprise any number or any type of scanning devices, without limit.

In accordance with the disclosed embodiments, the HMD 200 may be used to generate a parallax-corrected passthrough visualization of the user's environment. As described earlier, a "passthrough" visualization refers to a visualization that reflects what the user would see if the user were not wearing the HMD 200, regardless of whether the HMD 200 is included as a part of an AR system or a VR system. To generate this passthrough visualization, the HMD 200 may use its scanning sensor(s) 205 to scan, map, or otherwise record its surrounding environment, including any objects in the environment, and to pass that data on to the user to view. In many cases, the passed-through data is modified to reflect or to correspond to a perspective of the user's pupils. The perspective may be determined by any type of eye tracking technique.

To convert a raw image into a passthrough image, the scanning sensor(s) 205 typically rely on its cameras (e.g., head tracking cameras, hand tracking cameras, depth cameras, or any other type of camera) to obtain one or more raw images (aka texture images) of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections.

As used herein, a "depth map" details the positional relationship and depths relative to objects in the environment. Consequently, the positional arrangement, location, geometries, contours, and depths of objects relative to one another can be determined. From the depth maps, a 3D representation of the environment can be generated.

Relatedly, from the passthrough visualizations, a user will be able to perceive what is currently in his/her environment without having to remove or reposition the HMD 200. Furthermore, as will be described in more detail later, the disclosed passthrough visualizations will also enhance the user's ability to view objects within his/her environment (e.g., by displaying additional environmental conditions that may not have been detectable by a human eye).

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 205 include visible light camera(s) 210, low light camera(s) 215, thermal imaging camera(s) 220, potentially (though not necessarily, as represented by the dotted box in FIG. 2) ultraviolet (UV) cameras 225, and potentially (though not necessarily, as represented by the dotted box) a dot illuminator 230. The ellipsis 235 demonstrates how any other type of camera or camera system (e.g., depth cameras, time of flight cameras, virtual cameras, depth lasers, etc.) may be included among the scanning sensor(s) 205.

As an example, a camera structured to detect mid-infrared wavelengths may be included within the scanning sensor(s) 205. As another example, any number of virtual cameras that are reprojected from an actual camera may be included among the scanning sensor(s) 205 and may be used to generate a stereo pair of images. In this manner and as will be discussed in more detail later, the scanning sensor(s) 205 may be used to generate the stereo pair of images. In some cases, the stereo pair of images may be obtained or generated as a result of performing any one or more of the following operations: active stereo image generation via use of two cameras and one dot illuminator (e.g., dot illuminator 230); passive stereo image generation via use of two cameras; image generation using structured light via use of one actual camera, one virtual camera, and one dot illuminator (e.g., dot illuminator 230); or image generation using a time of flight (TOF) sensor in which a baseline is present between a depth laser and a corresponding camera and in which a field of view (FOV) of the corresponding camera is offset relative to a field of illumination of the depth laser.

Generally, a human eye is able to perceive light within the so-called "visible spectrum," which includes light (or rather, electromagnetic radiation) having wavelengths ranging from about 380 nanometers (nm) up to about 740 nm. As used herein, the visible light camera(s) 210 include two or more red, green, blue (RGB) cameras structured to capture light photons within the visible spectrum. Often, these RGB cameras are complementary metal-oxide-semiconductor (CMOS) type cameras, though other camera types may be used as well (e.g., charge coupled devices, CCD).

The RGB cameras are typically stereoscopic cameras, meaning that the fields of view of the two or more RGB cameras at least partially overlap with one another. With this overlapping region, images generated by the visible light camera(s) 210 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 210 can be used to not only generate passthrough visualizations, but they can also be used to determine object depth. In some embodiments, the visible light camera(s) 210 can capture both visible light and IR light.

The low light camera(s) 215 are structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 30,000 nm). Mid-IR has energy values in between or in the middle of the near-IR and far-IR ranges. The low light camera(s) 215 are structured to detect or be sensitive to IR light in at least the near-IR range.

In some embodiments, the visible light camera(s) 210 and the low light camera(s) 215 (aka low light night vision cameras) operate in approximately the same overlapping wavelength range. In some cases, this overlapping wavelength range is between about 400 nanometers and about 1,000 nanometers. Additionally, in some embodiments these two types of cameras are both silicon detectors.

One distinguishing feature between these two types of cameras is related to the illuminance conditions or illuminance range(s) in which they actively operate. In some cases, the visible light camera(s) 210 are low power cameras and operate in environments where the illuminance is between about 10 lux and about 100,000 lux, or rather, the illuminance range begins at about 10 lux and increases beyond 10 lux. In contrast, the low light camera(s) 215 consume more power and operate in environments where the illuminance range is between about 1 milli-lux and about 10 lux.

The thermal imaging camera(s) 220, on the other hand, are structured to detect electromagnetic radiation or IR light in the far-IR (i.e. thermal-IR) range, though some embodiments also enable the thermal imaging camera(s) 220 to detect radiation in the mid-IR range. To clarify, the thermal imaging camera(s) 220 may be a long wave infrared imaging camera structured to detect electromagnetic radiation by measuring long wave infrared wavelengths. Often, the thermal imaging camera(s) 220 detect IR radiation having wavelengths between about 8 microns and 14 microns. Because the thermal imaging camera(s) 220 detect far-IR radiation, the thermal imaging camera(s) 220 can operate in any illuminance condition, without restriction.

In some cases (though not all), the thermal imaging camera(s) 220 include an uncooled thermal imaging sensor. An uncooled thermal imaging sensor uses a specific type of detector design that is based on a bolometer, which is a device that measures the magnitude or power of an incident electromagnetic wave/radiation. To measure the radiation, the bolometer uses a thin layer of absorptive material (e.g., metal) connected to a thermal reservoir through a thermal link. The incident wave strikes and heats the material. In response to the material being heated, the bolometer detects a temperature-dependent electrical resistance. Changes to environmental temperature cause changes to the bolometer's temperature, and these changes can be converted into an electrical signal to thereby produce a thermal image of the environment. In accordance with at least some of the disclosed embodiments, the uncooled thermal imaging sensor is used to generate any number of thermal images. The bolometer of the uncooled thermal imaging sensor can detect electromagnetic radiation across a wide spectrum, spanning the mid-IR spectrum, the far-IR spectrum, and even up to millimeter-sized waves.

The UV camera(s) 225 are structured to capture light in the UV range. The UV range includes electromagnetic radiation having wavelengths between about 10 nm and about 400 nm. The disclosed UV camera(s) 225 should be interpreted broadly and may be operated in a manner that includes both reflected UV photography and UV induced fluorescence photography.

Accordingly, as used herein, reference to "visible light cameras" (including "head tracking cameras"), are cameras that are primarily used for computer vision to perform head tracking. These cameras can detect visible light, or even a combination of visible and IR light (e.g., a range of IR light, including IR light having a wavelength of about 850 nm). In some cases, these cameras are global shutter devices with pixels being about 3 μm in size. Low light cameras, on the other hand, are cameras that are sensitive to visible light and near-IR. These cameras are larger and may have pixels that are about 8 μm in size or larger. These cameras are also sensitive to wavelengths that silicon sensors are sensitive to, which wavelengths are between about 350 nm to 1100 nm. Thermal/long wavelength IR devices (i.e. thermal imaging cameras) have pixel sizes that are about 10 μm or larger and detect heat radiated from the environment. These cameras are sensitive to wavelengths in the 8 μm to 14 μm range. Some embodiments also include mid-IR cameras configured to detect at least mid-IR light. These cameras often comprise non-silicon materials (e.g., InP or InGaAs) that detect light in the 800 nm to 2 μm wavelength range.

Accordingly, the disclosed embodiments may be structured to utilize numerous different camera types. The different camera types include, but are not limited to, visible light cameras, low light cameras, thermal imaging cameras, and UV cameras. Stereo depth matching may be performed using images generated from any one type or combination of types of the above listed camera types.

Generally, the low light camera(s) 215, the thermal imaging camera(s) 220, and the UV camera(s) 225 (if present) consume relatively more power than the visible light camera(s) 210. Therefore, when not in use, the low light camera(s) 215, the thermal imaging camera(s) 220, and the UV camera(s) 225 are typically in the powered-down state in which those cameras are either turned off (and thus consuming no power) or in a reduced operability mode (and thus consuming substantially less power than if those cameras were fully operational). In contrast, the visible light camera(s) 210 are typically in the powered-up state in which those cameras are by default fully operational.

It should be noted that any number of cameras may be provided on the HMD 200 for each of the different camera types. That is, the visible light camera(s) 210 may include 1, 2, 3, 4, 5, 6, 7, 8, 9, 10, or more than 10 cameras. Often, however, the number of cameras is at least 2 so the HMD 200 can perform stereoscopic depth matching, as described earlier. Similarly, the low light camera(s) 215, the thermal imaging camera(s) 220, and the UV camera(s) 225 may each respectively include 1, 2, 3, 4, 5, 6, 7, 8, 9, 10, or more than 10 corresponding cameras.

Figure 3:
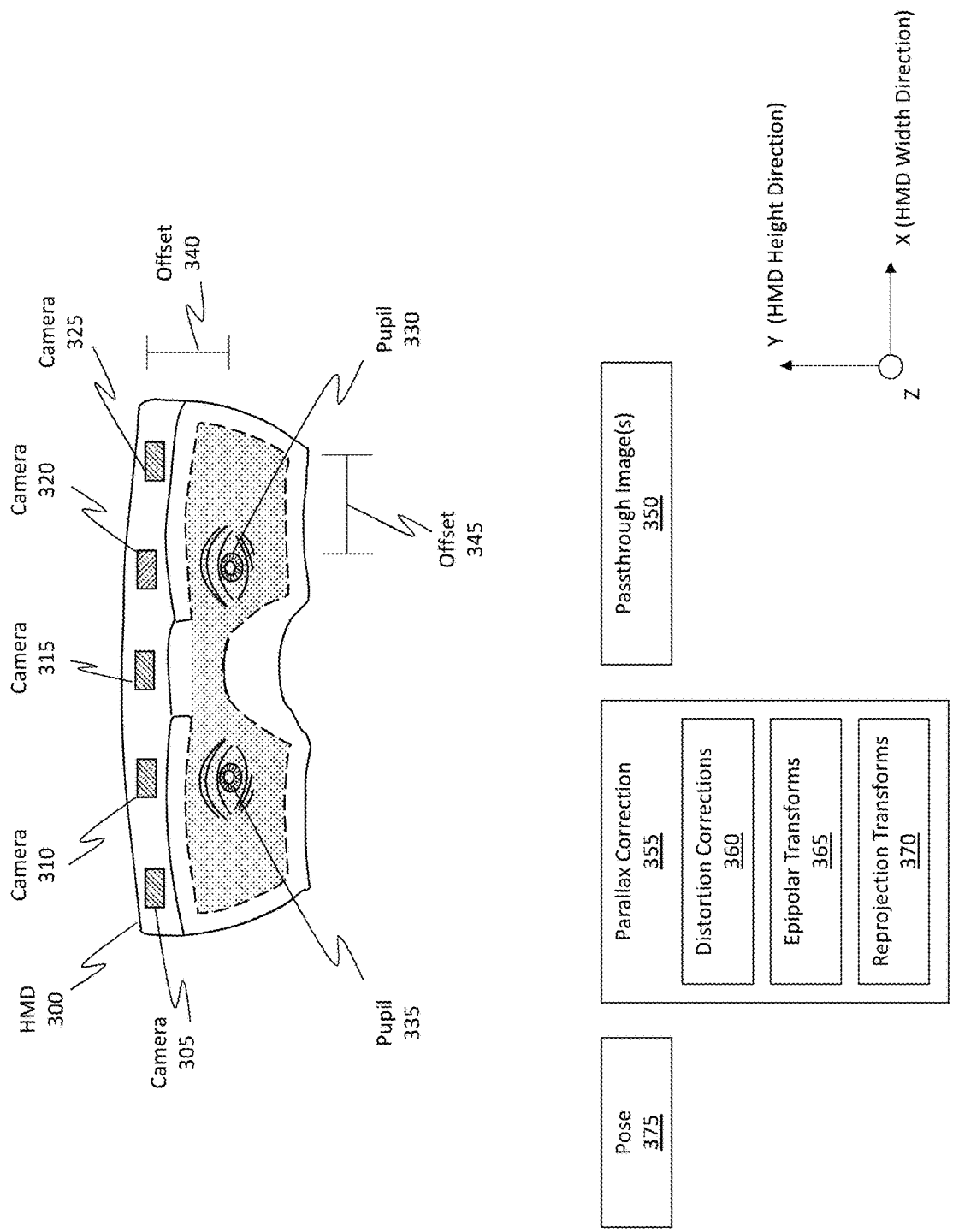
FIG. 3 illustrates various structural configurations of an example HMD as well as a parallax correction operation.

FIG. 3 illustrates an example HMD 300, which is representative of the HMD 200 from FIG. 2. HMD 300 is shown as including multiple different cameras, including cameras 305, 310, 315, 320, and 325. Cameras 305-325 are representative of any number or combination of the visible light camera(s) 210, the low light camera(s) 215, the thermal imaging camera(s) 220, and the UV camera(s) 225 from FIG. 2. While only 5 cameras are illustrated in FIG. 3, HMD 300 may include more or less than 5 cameras.

In some cases, the cameras can be located at specific positions on the HMD 300. For instance, in some cases a first camera (e.g., perhaps camera 320) is disposed on the HMD 300 at a position above a designated left eye position of any users who wear the HMD 300 relative to a height direction of the HMD. For instance, the camera 320 is positioned above the pupil 330. As another example, the first camera (e.g., camera 320) is additionally positioned above the designated left eye position relative to a width direction of the HMD. That is, the camera 320 is positioned not only above the pupil 330 but also in-line relative to the pupil 330. When a VR system is used, a camera may be placed directly in front of the designated left eye position. For example, with reference to FIG. 3, a camera may be physically disposed on the HMD 300 at a position in front of the pupil 330 in the z-axis direction.

When a second camera is provided (e.g., perhaps camera 310), the second camera may be disposed on the HMD at a position above a designated right eye position of any users who wear the HMD relative to the height direction of the HMD. For instance, the camera 310 is above the pupil 335. In some cases, the second camera is additionally positioned above the designated right eye position relative to the width direction of the HMD. When a VR system is used, a camera may be placed directly in front of the designated right eye position. For example, with reference to FIG. 3, a camera may be physically disposed on the HMD 300 at a position in front of the pupil 335 in the z-axis direction.

When a user wears HMD 300, HMD 300 fits over the user's head and the HMD 300's display is positioned in front of the user's pupils, such as pupil 330 and pupil 335. Often, the cameras 305-325 will be physically offset some distance from the user's pupils 330 and 335. For instance, there may be a vertical offset in the HMD height direction (i.e. the "Y" axis), as shown by offset 340. Similarly, there may be a horizontal offset in the HMD width direction (i.e. the "X" axis), as shown by offset 345.

As described earlier, HMD 300 is configured to provide passthrough image(s) 350 for the user of HMD 300 to view. In doing so, HMD 300 is able to provide a visualization of the real world without requiring the user to remove or reposition HMD 300. These passthrough image(s) 350 effectively represent the same view the user would see if the user were not wearing HMD 300. Cameras 305-325 are used to provide these passthrough image(s) 350.

None of the cameras 305-325, however, are directly aligned with the pupils 330 and 335. The offsets 340 and 345 actually introduce differences in perspective as between the cameras 305-325 and the pupils 330 and 335. These perspective differences are referred to as "parallax."

Because of the parallax occurring as a result of the offsets 340 and 345, raw images (aka texture images) produced by the cameras 305-325 are not available for immediate use as passthrough image(s) 350. Instead, it is beneficial to perform a parallax correction 355 (aka an image synthesis) on the raw images to transform the perspectives embodied within those raw images to correspond to perspectives of the user's pupils 330 and 335. The parallax correction 355 includes any number of distortion corrections 360 (e.g., to correct for concave or convex wide or narrow angled camera lenses), epipolar transforms 365 (e.g., to parallelize the optical axes of the cameras), and/or reprojection transforms 370 (e.g., to reposition the optical axes so as to be essentially in front of or in-line with the user's pupils). The parallax correction 355 includes performing depth computations to determine the depth of the environment and then reprojecting images to a determined location or as having a determined perspective. As used herein, the phrases "parallax correction" and "image synthesis" may be interchanged with one another and may include performing stereo passthrough parallax correction and/or image reprojection parallax correction.

The reprojections are based on a current pose 375 of the HMD 300 relative to its surrounding environment. Based on the pose 375 and the depth maps that are generated, the embodiments are able to correct parallax by reprojecting a perspective embodied by the raw images to coincide with a perspective of the user's pupils 330 and 335.

The embodiments perform three-dimensional (3D) geometric transforms on the raw camera images to transform the perspectives of the raw images in a manner so as to correlate with the perspectives of the user's pupils 330 and 335. Additionally, the 3D geometric transforms rely on depth computations in which the objects in the HMD 300's environment are mapped out to determine their depths as well as the pose 375. Based on these depth computations and pose 375, the embodiments are able to three-dimensionally reproject or three-dimensionally warp the raw images in such a way so as to preserve the appearance of object depth in the passthrough image(s) 350, where the preserved object depth substantially matches, corresponds, or visualizes the actual depths of objects in the real world. Accordingly, the degree or amount of the parallax correction 355 is at least partially dependent on the degree or amount of the offsets 340 and 345.

By performing the parallax correction 355, the embodiments effectively create "virtual" cameras having positions that are in front of the user's pupils 330 and 335. By way of additional clarification, consider the position of camera 305, which is currently above and to the left of the pupil 335. By performing the parallax correction 355, the embodiments programmatically transform images generated by camera 305, or rather the perspectives of those images, so the perspectives appear as though camera 305 were actually positioned immediately in front of pupil 335. That is, even though camera 305 does not actually move, the embodiments are able to transform images generated by camera 305 so those images have the appearance as if camera 305 were positioned in front of pupil 335.

Stereo Depth Matching

Figure 4:
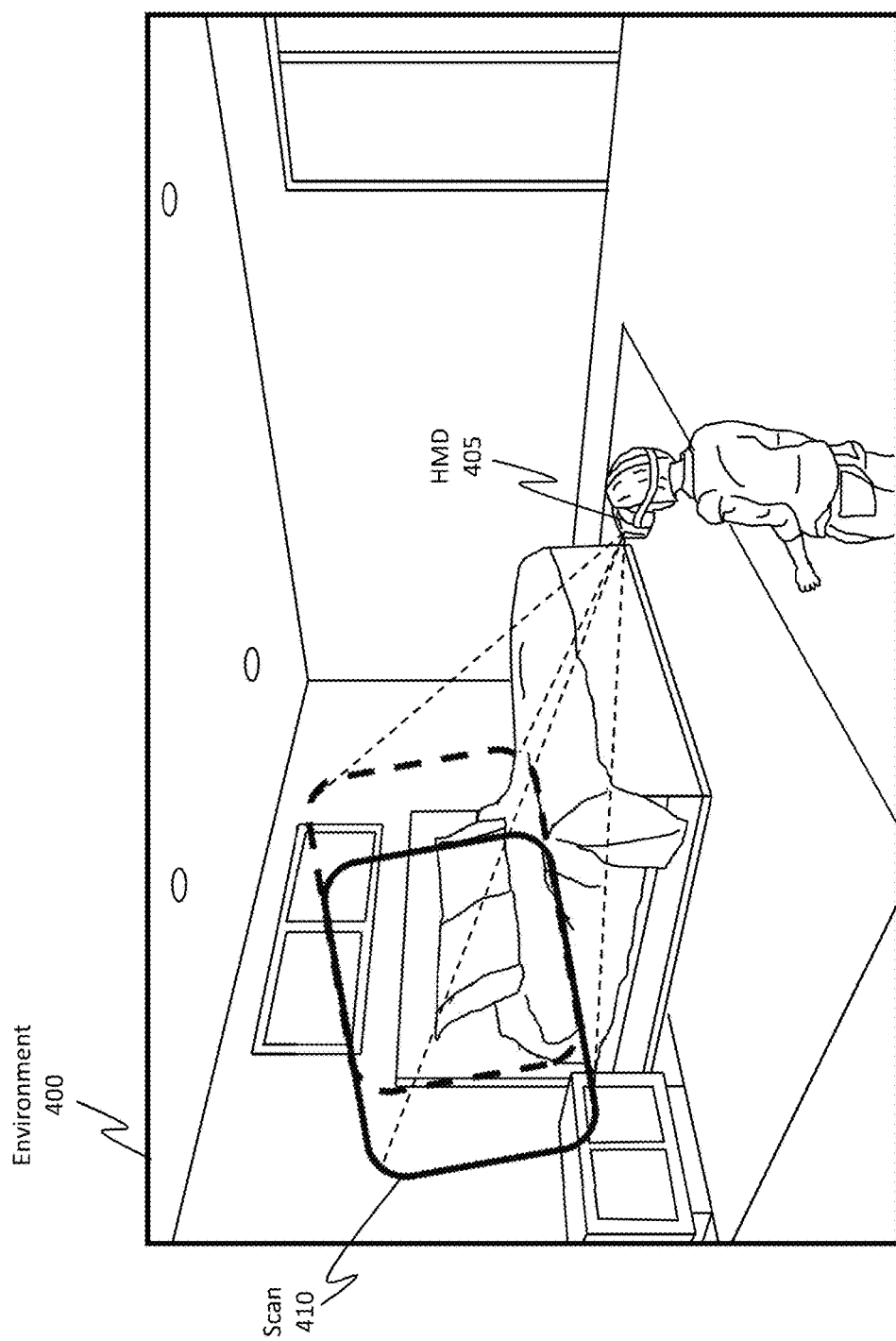
FIG. 4 illustrates an example process of scanning an environment using a stereo camera pair to obtain stereo images of the environment.

FIG. 4 shows an example environment 400 in which an HMD 405, which is representative of the HMDs discussed thus far, is operating. Here, the HMD 405 is performing a scan 410 of the environment 400 in an effort to identify depths of the objects included therein, as described earlier. Determining the depths can be performed using stereo depth matching, which is based on the disparity between common pixels that exist between two different stereo images.

Figure 5:
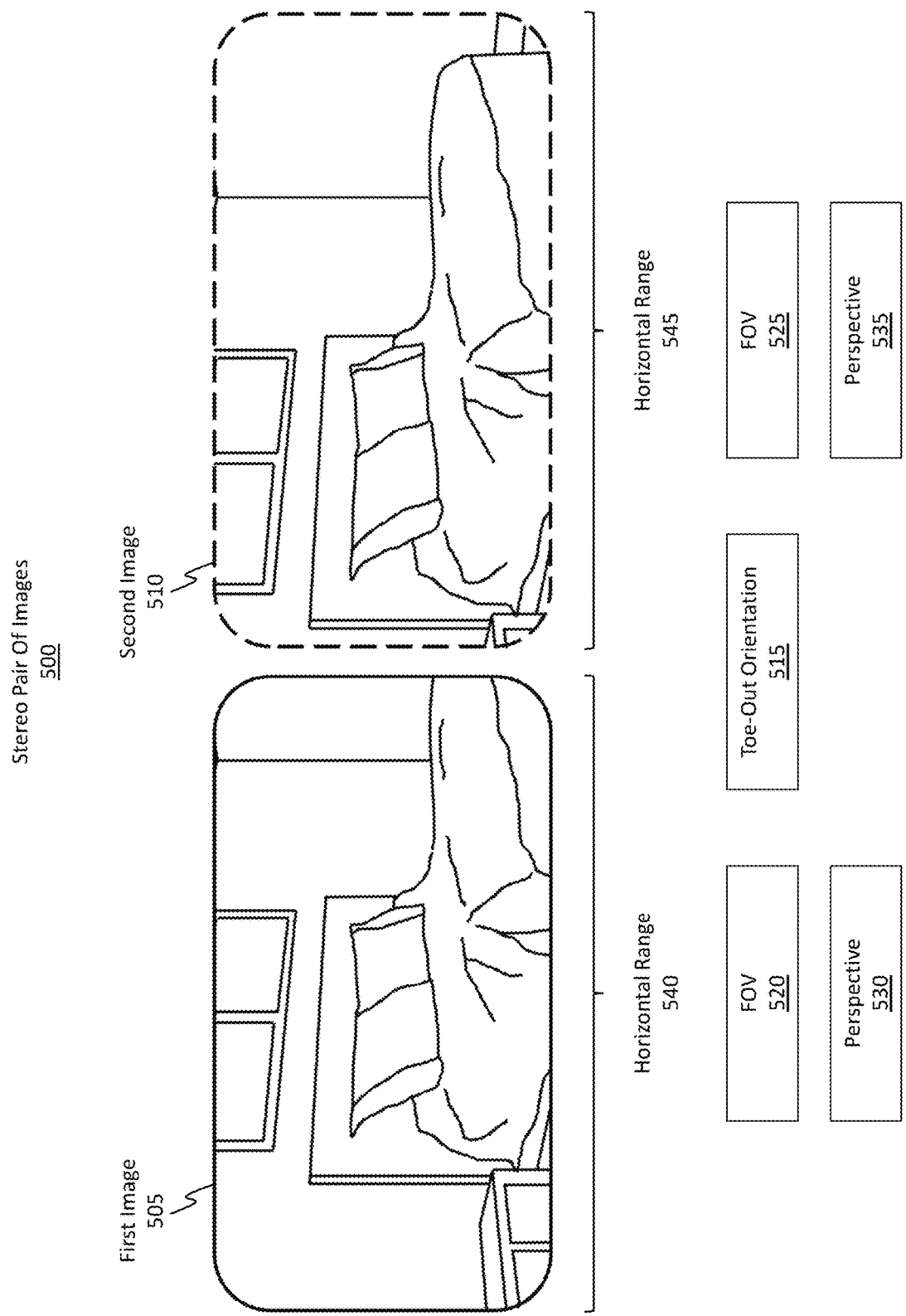
FIG. 5 illustrates an example of a stereo pair of images.

FIG. 5 shows a stereo pair of images 500, which includes a first image 505 and a second image 510. The stereo pair of images 500 may have been generated using any of the cameras discussed earlier. By way of example, the first image 505 is generated by a first camera and the second image 510 is generated by a second camera. The first camera is one camera selected from a group of cameras comprising a visible light camera, a low light camera, a thermal imaging camera, or a UV camera. Similarly, the second camera is also one camera selected from the group of cameras. In some cases, the first and second camera are the same while in other cases they are different.

Because those cameras have a physical toe-out orientation 515 relative to one another (i.e. their optical axes are angled relative to one another), the FOVs of the resulting images only partially overlap one another. For instance, the FOV 520 of the first image 505 only partially overlaps the FOV 525 of the second image 510. Additionally, because the cameras are positioned at different locations on the HMD, the perspective 530 of the environment, as captured by the first image 505, is different from the perspective 535 of the environment, as captured by the second image 510.

FIG. 5 also shows how the first image 505 has a horizontal range 540 and how the second image 510 has a horizontal range 545. In some embodiments, the horizontal ranges 540 and 545 are the same because similar cameras (e.g., two visible light cameras or two low light cameras, etc.) are used to capture the images. In some embodiments, the horizontal ranges 540 and 545 are different because different cameras (e.g., a visible light camera and a low light or thermal camera, etc.) are used. Generally, the horizontal ranges 540 and 545 span a range comprising between about a 50-degree horizontal sweep and a 75-degree horizontal sweep. In some embodiments the horizontal ranges 540 and 545 span about a 65-degree horizontal sweep. In some embodiments, the FOV of an image (i.e. the horizontal range) comprises at least a 60-degree horizontal range or sweep. Additionally, in some embodiments, the vertical ranges span a range comprising between about a 30-degree vertical sweep and a 50-degree vertical sweep. In some cases, the vertical range is about 40-degrees.

Figure 6:
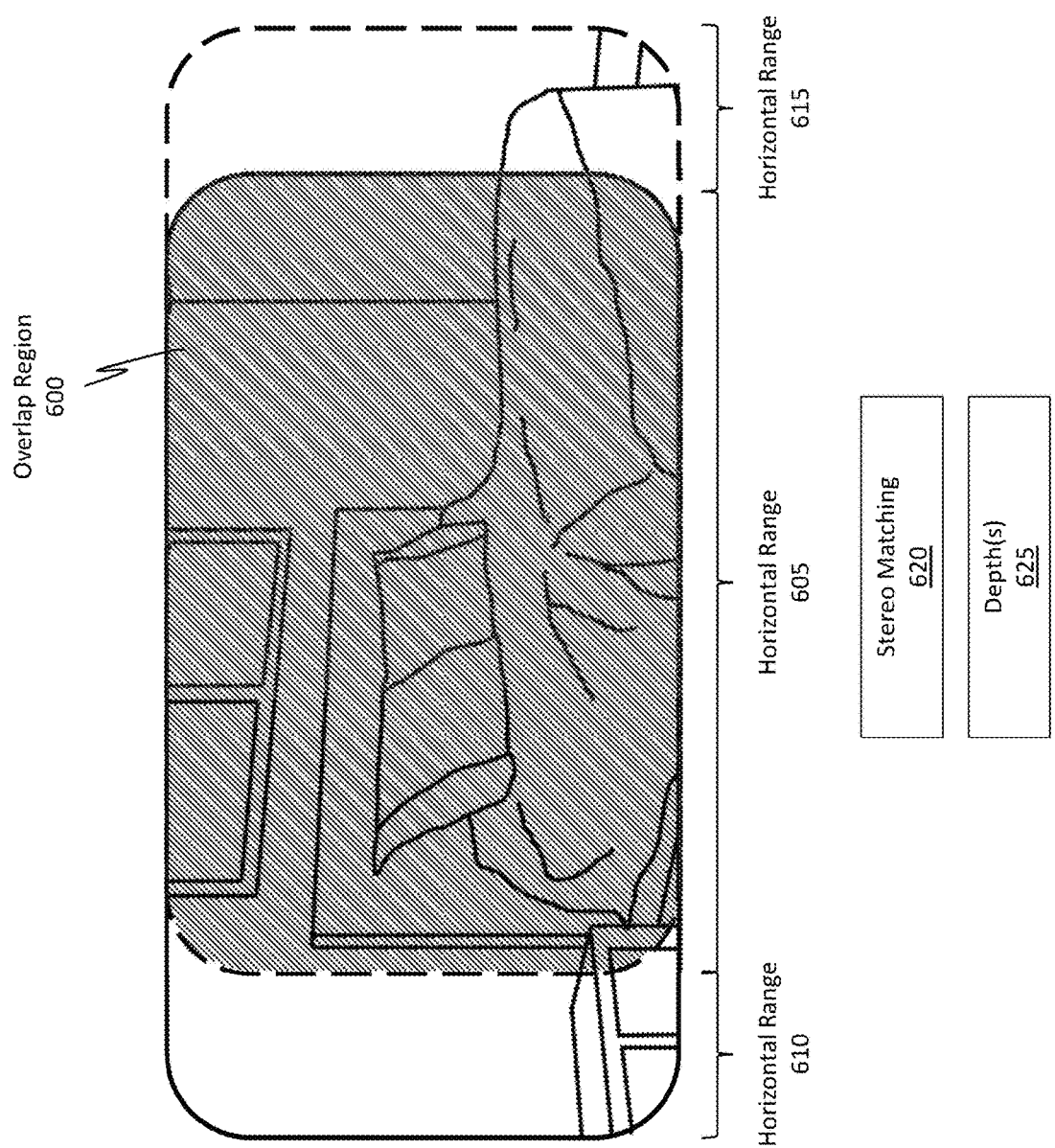
FIG. 6 illustrates how at least a portion of the two images included in the stereo pair overlap with one another.

FIG. 6 provides additional clarification on how the FOVs 520 and 525 from FIG. 5 at least partially overlap. Specifically, FIG. 6 shows a merged version of the first image 505 and the second image 510. FIG. 6 also shows an overlap region 600 where pixels from the first image 505 are common with pixels from the second image 510. That is, those pixels represent the same area of the environment such that the area is captured from two different perspectives. In some embodiments, the overlap region 600 as between the two images has a horizontal range 605 spanning between about 40-degrees to 60-degrees. In some embodiments, the horizontal range 605 is about 50-degrees. The remaining horizontal ranges 610 and 615 are often around 7.5-degrees each (or 15-degree cumulative), though these ranges can vary as well depending on the previous ranges described above. For instance, in some embodiments, the horizontal ranges 610 and 615 (which correspond to a so-called "non-overlap region") comprise at least a 10-degree horizontal range of the FOV of a particular image.

By identifying common pixels between the two images, which common pixels will lie within the overlap region 600, the embodiments are able to perform stereo matching 620 (aka stereo depth matching or stereoscopic depth matching) by identifying the coordinates for those common pixels and then identifying the disparity that exists between the coordinates. This disparity enables the stereo depth matching algorithm to determine depth(s) 625 for the pixels (or rather the objects) in the images residing in the overlap region 600. The depths can then be included in a depth map, which may be used to correct parallax.

Based on the above disclosure, one can observe how the horizontal range or resolution of the resulting depth map may be smaller than the horizontal range of an image displayed to the user. That is, the horizontal range of the depth map may be limited to correspond to the range of the overlap region 600 whereas the horizontal range of the image is larger.

Figure 7:
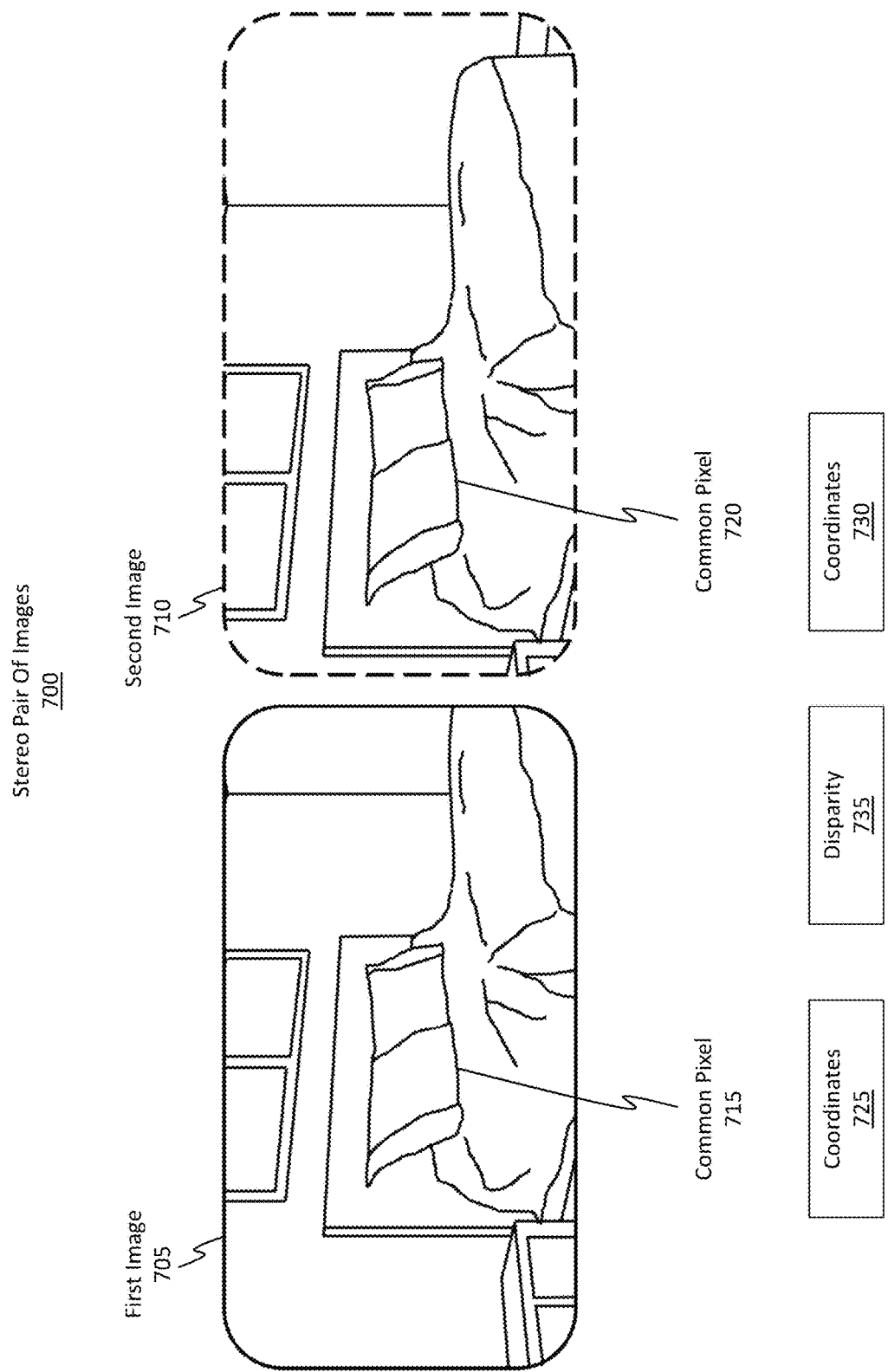
FIG. 7 illustrates how portions of the stereo images capture common objects such that some pixels of those two images are common relative to one another.

FIG. 7 provides some additional clarification regarding disparities between pixels. Specifically, FIG. 7 shows a stereo pair of images 700 (i.e. a pair of texture images), which is representative of the images discussed thus far. Here, the stereo pair of images 700 includes a first image 705 and a second image 710. Both images include similar content (e.g., the bed), as represented by common pixel 715 and common pixel 720.

That is, both of these pixels are representing the same part of the pillow in the Figure. Common pixel 715 is associated with its own corresponding set of coordinates 725 relative to that pixel's location in the first image 705. Similarly, common pixel 720 is associated with its own corresponding set of coordinates 730 relative to that pixel's location in the second image 710. The disparity 735 between the coordinates 725 and 730 is used to reflect the depth of the pillow at that location relative to the HMD.

If no noise is present as between the first image 705 and the second image 710, then the depth will be quite accurate. If noise is present in either one of those two images, however, then the depth will likely be skewed. Accordingly, the remaining portions of this disclosure will focus on example techniques for generating accurate depth maps even when noise is present in texture images, which noise may occur as a result of low ambient light conditions, camera settings, isothermal conditions (e.g., when thermal images are used), or perhaps other environmental conditions.

Cost Function

Figure 8:
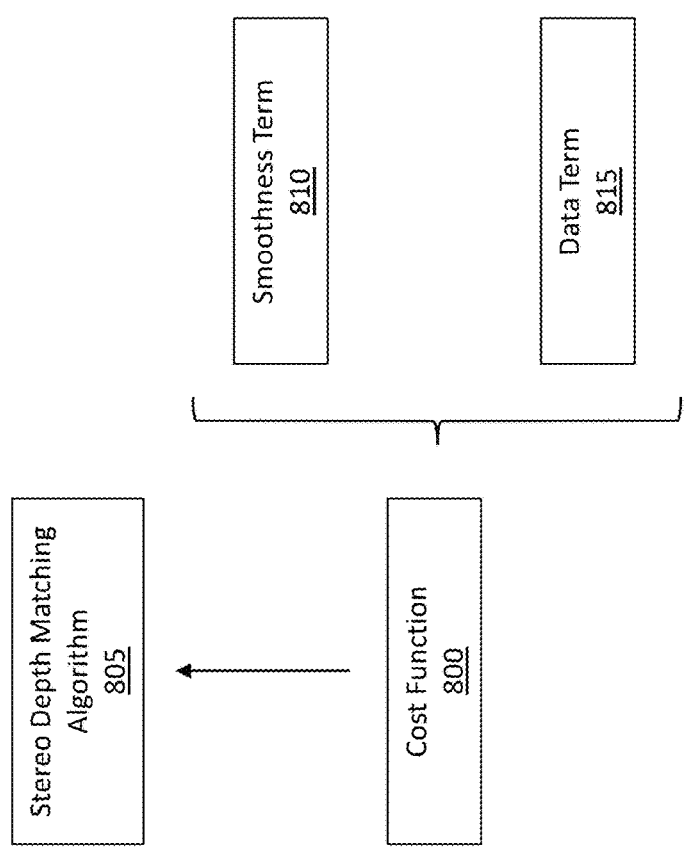
FIG. 8 illustrates an example cost function used by a stereo depth matching algorithm, where the cost function includes both a smoothness term and a data term.

Attention will now be directed to FIG. 8, which illustrates an example cost function 800 that is used by a stereo depth matching algorithm 805 when computing depths based on a stereo pair of images. The stereo depth matching algorithm 805 includes, but is not limited to, a local correlation-based stereo matching algorithm, a semi-global stereo matching algorithm, and a global stereo matching algorithm.

Generally, the cost function 800 refers to a technique for measuring similarities between image locations. The simplest types of cost functions simply assume constant color intensities at corresponding or matching locations within the two texture images. More mature or robust cost functions are able to take into account noise and even radiometric changes, where the term "radiometric" generally means that corresponding pixels should have similar intensity values. Radiometric differences can be caused by a number of factors, including noise, vignetting, camera settings, lens differences, non-Lambertian surfaces, and so forth. Generally, the cost function 800 relies on two separate terms, which include a smoothness term 810 and a data term 815.

Starting with the data term 815, the data term 815 generally states that matching pixels should have the same or sufficiently similar color intensity values. With reference to FIG. 7, the common pixel 715 and the common pixel 720 are both representative of a specific location on the pillow in the figure. Because the first image 705 and the second image 710 were generated at the same time and show matching content, the intensity value for the common pixel 715 should match the intensity value for the common pixel 720. The data term 815 represents this color intensity matching concept.

The smoothness term 810, on the other hand, states that neighboring pixels are to have the same or sufficiently similar disparity values. If that is not the case, then a smoothness penalty (to be discussed in more detail later) is applied, which increases the cost of the cost function 800. A minimum smoothness penalty is almost always (but not strictly always) applied to the smoothness term 810.

With that initial understanding, one will appreciate how noise introduced into the texture images (i.e. the stereo pair of images) can impact both the data term 815 and the smoothness term 810. Noise can be introduced in a number of ways. For instance, noise can occur as a result of poor ambient light conditions, differences in camera settings, lens differences, differences in camera types being used (e.g., perhaps one low light camera and one visible light camera are being used to generate the stereo pair of images), differences in gain settings, uniform isothermal conditions in an environment (e.g., when thermal images are used), and so forth. Because MR systems are used in a wide variety of environments, the ambient light levels often play a significant role in the cause for noise, which results in a poor SNR for the texture images.

By way of example, some environments are brightly lit, some are dimly lit, and some have combinations of brightly lit areas and dimly lit areas. For reference, a bright sunny day typically has an ambient light intensity of around 10,000-50,000 lux. An overcast day typically has an ambient light intensity of around 1,000-10,000 lux. An indoor office typically has an ambient light intensity of around 100-300 lux. The time of day corresponding to twilight typically has an ambient light intensity of around 10 lux. Deep twilight has an ambient light intensity of around 1 lux. As used herein, a "dim" or "low" light environment or area at least corresponds to any environment or area in which the ambient light intensity is at or below about 40 lux. A "bright" light environment or area at least corresponds to any environment or area in which the ambient light intensity is at or above about 5,000 lux. A "dark" environment at least corresponds to any environment or area in which the light intensity is below about 1 lux. Unless specified as being a "low" light or a "dark" environment, reference to a "lighted" environment corresponds to any environment or area that is above about 40 lux.

Figure 9:
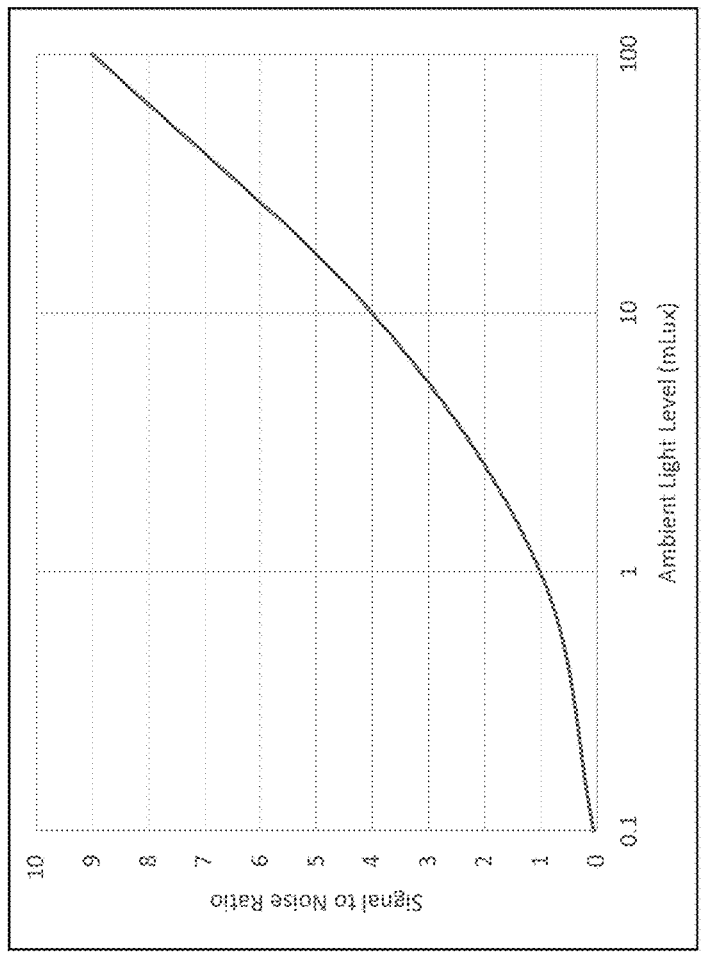
FIG. 9 illustrates how the signal to noise ratio (SNR) is impacted based at least on the ambient light levels of an environment.
Figure 10:
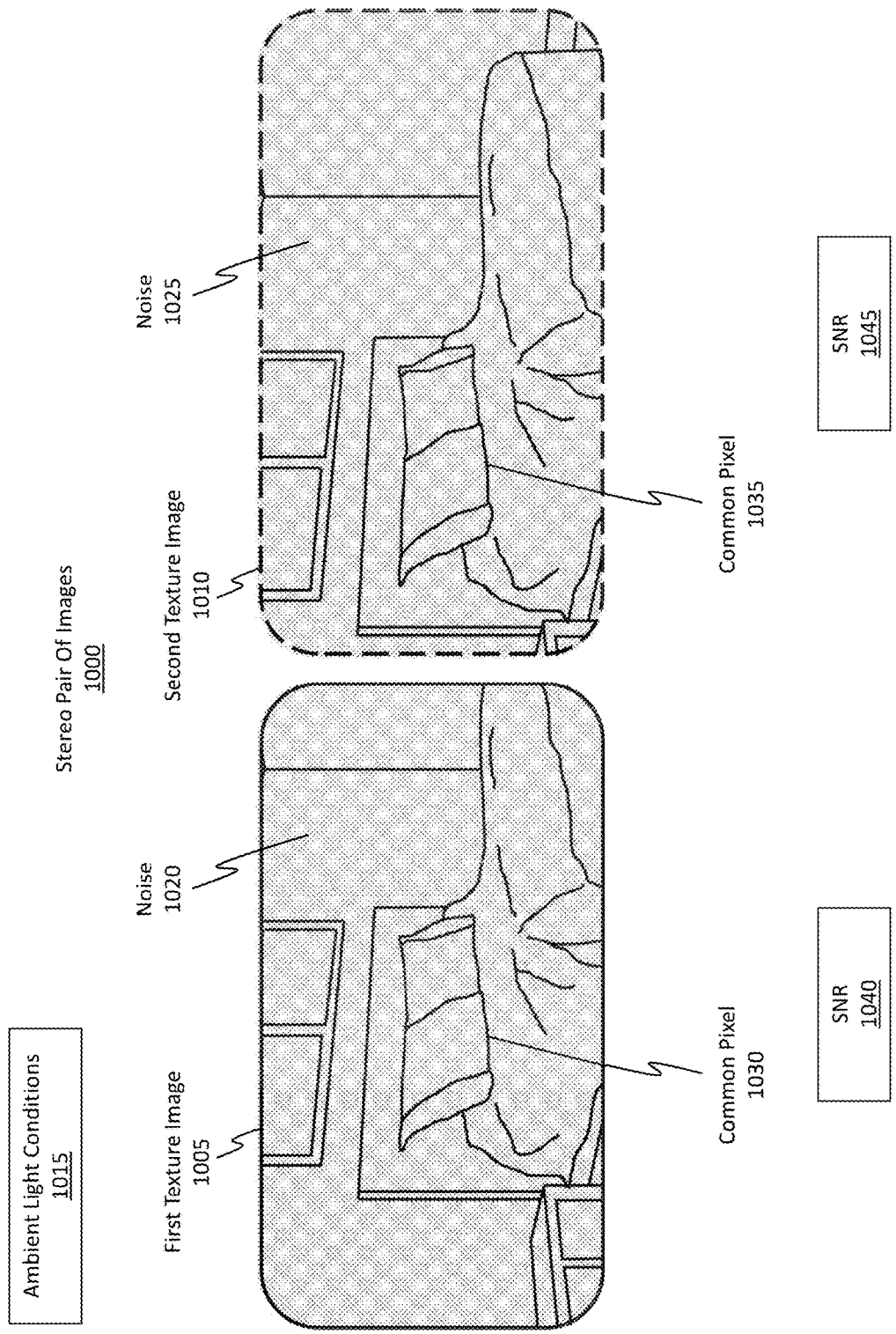
FIG. 10 illustrates how poor SNRs results in poor texture images because more noise will be in those images.

FIG. 9 illustrates a SNR chart 900 indicating how the SNR is dependent on the ambient light level. Once the ambient light level drops below about 4 mLux or 5 mLux, then the noise level becomes a challenge and the texture images become nearly unusable as a result of the poor SNR present in those images. FIG. 10 is illustrative.

FIG. 10 shows a stereo pair of images 1000, which are representative of the texture images discussed thus far. The stereo pair of images 1000 includes a first texture image 1005 and a second texture image 1010. These images were captured under certain ambient light conditions 1015 that are low light or even dark. Additionally, or alternatively, the images may be thermal images reflecting isothermal conditions of the environment. If the isothermal conditions are uniform, then the uniformity may cause noise. Similarly, as a result of the low light ambient conditions, noise 1020 is introduced into the first texture image 1005 and noise 1025 is introduced into the second texture image 1010, as reflected by the shading in FIG. 10. These two images capture similar content, so there is a common pixel 1030 that is supposed to correspond to the common pixel 1035. Because of the noise, however, there is a poor SNR 1040 for the first texture image 1005 and a poor SNR 1045 for the second texture image 1010. What this means is that the intensity and disparity of those two pixels might vary drastically.

Figure 11:
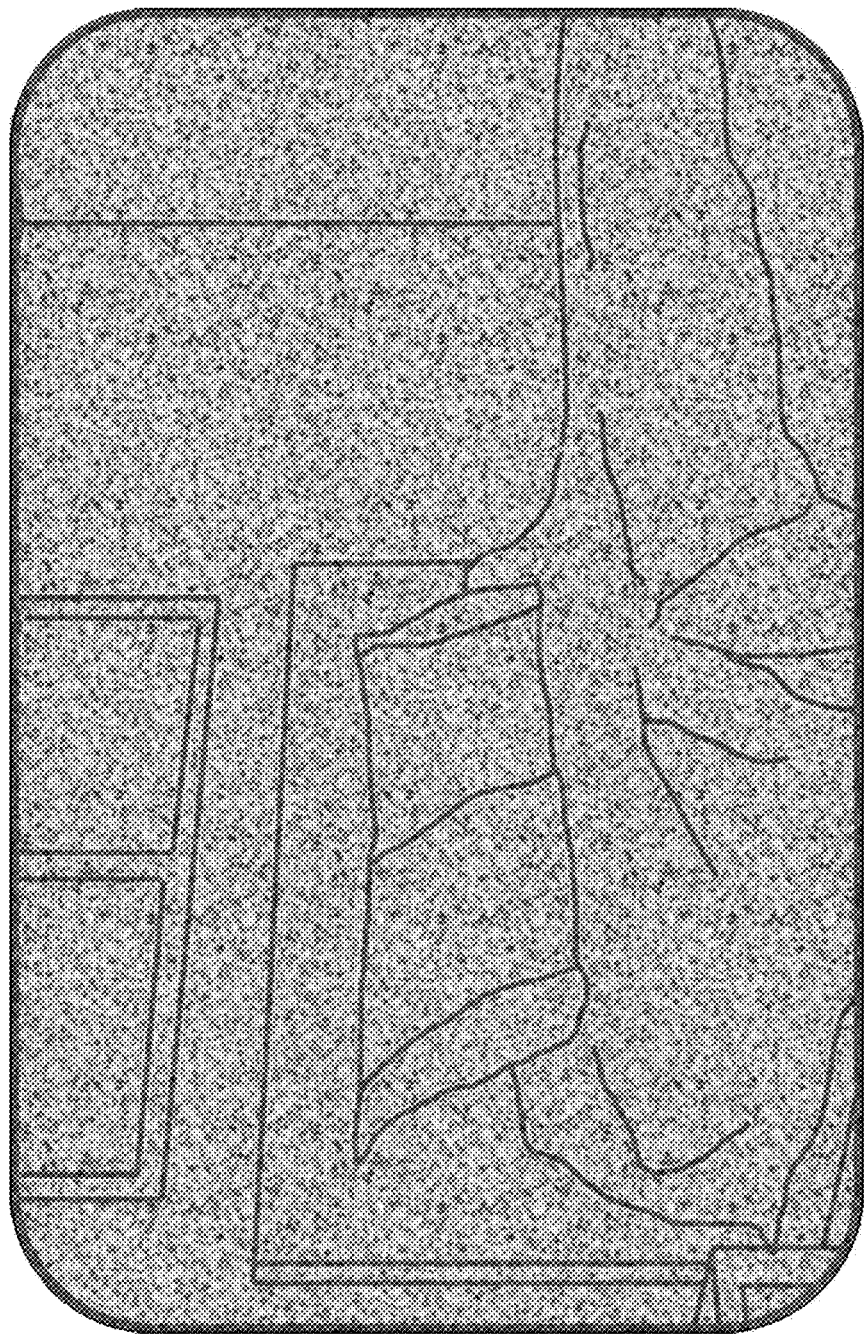
FIG. 11 illustrates how, if a depth map is generated based on poor quality texture images, then the resulting depth map will also be low in quality.

FIG. 11 shows a resulting depth map 1100 that may be generated based on the stereo pair of images 1000 of FIG. 10. As evidenced by the grainy and obscure content shown in FIG. 11, the resulting depth map 1100 is of poor quality. If such a depth map were used to perform parallax correction, then the resulting parallax-corrected images will likely be inaccurate and may hinder the user's experience with the HMD. With that understanding, the disclosed embodiments operate to improve how depth maps are generated when texture images have sub-optimal or poor SNRs. A SNR that is considered to be "poor" can be set to any desired value, but typically a "poor" SNR is an SNR having a value less than or equal to about a value of 4, as shown in FIG. 9. A value of 4 corresponds to about an ambient light level of around 10 mLux, which corresponds to the time of day associated with twilight.

Prioritizing the Smoothness Term in the Cost Function

Figure 12:
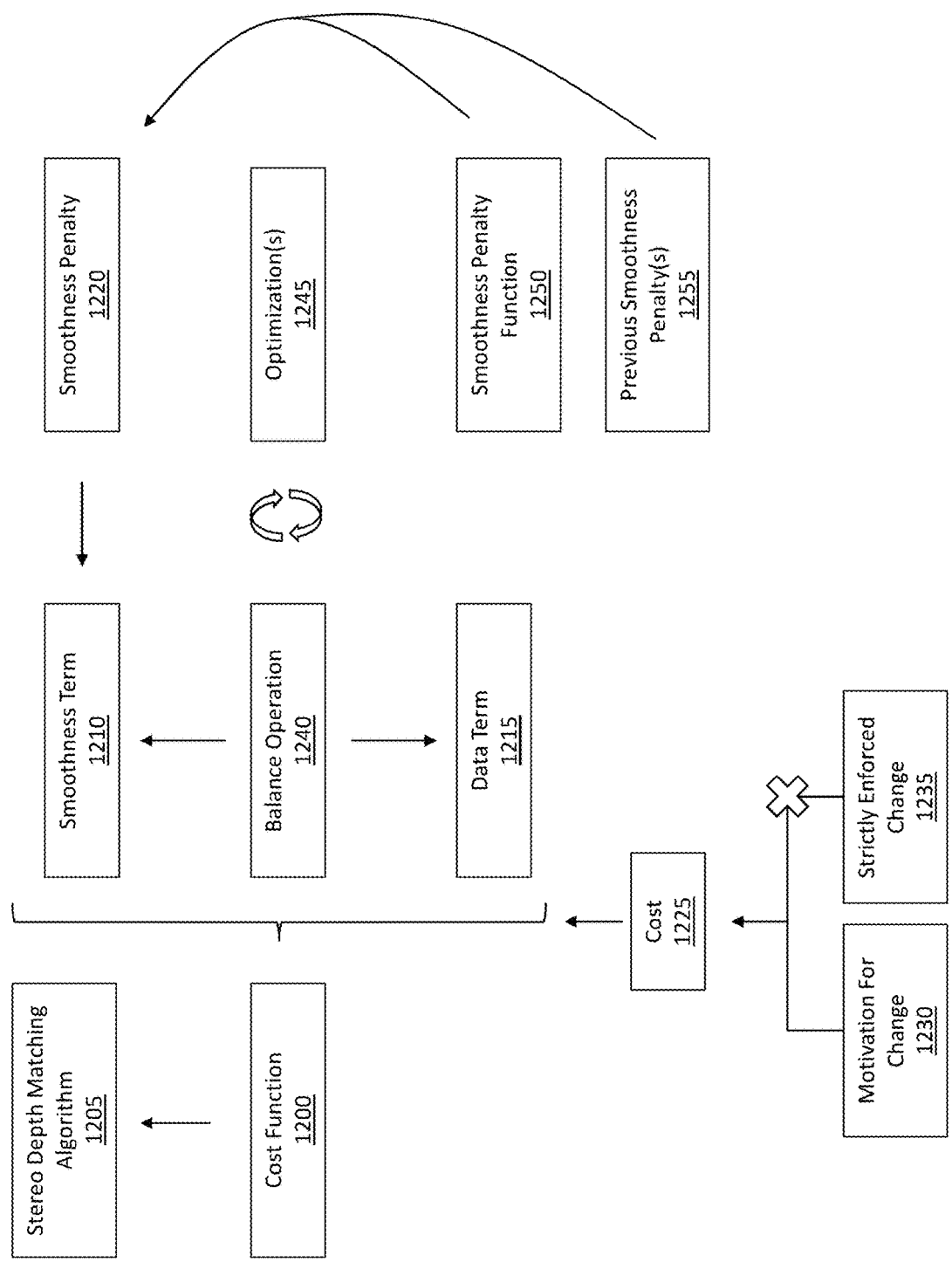
FIG. 12 illustrates example operations that may be performed to prioritize the smoothness term of the cost function over the data term of the cost function in order to improve depth map quality by flattening the depth map at areas that would otherwise have skewed depth data.

Attention will now be directed to FIG. 12, which illustrates a figure similar to that of FIG. 8. Specifically, FIG. 12 shows a cost function 1200, a stereo depth matching algorithm 1205, a smoothness term 1210 and a data term 1215, all of which correspond to their matching elements in FIG. 8. In accordance with the disclosed principles, when a condition involving a poor SNR is present, the embodiments cause the cost function 1200 to emphasize or prioritize the smoothness term 1210 over the data term 1215. The result of prioritizing the smoothness term 1210 is that the resulting disparity map (i.e. the depth map) is going to be flatter than it might otherwise be without prioritizing the smoothness term 1210.

Figure 13:
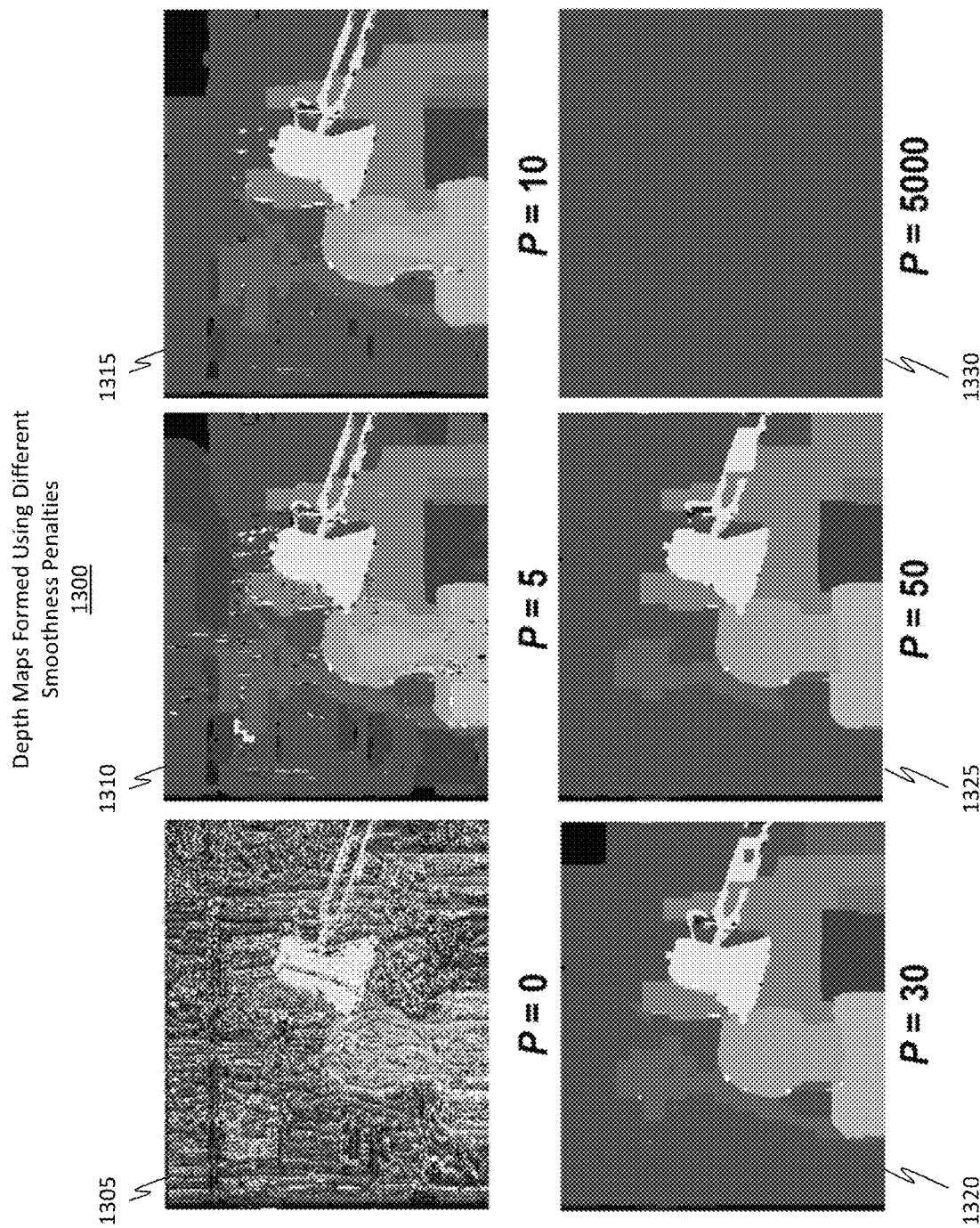
FIG. 13 illustrates actual depth maps that are generated using different smoothness penalties.

To emphasize the smoothness term 1210, the embodiments dynamically change, modify, alter, or select a higher smoothness penalty 1220 than what may normally be used (i.e. the default smoothness penalty). This smoothness penalty 1220 is effectively applied to neighboring pixels that have different disparities in the texture images. FIG. 13 provides a useful illustration that will help facilitate the discussion.

FIG. 13 shows depth maps formed using different smoothness penalties 1300. Specifically, there are six different depth maps that are shown (depth map 1305, 1310, 1315, 1320, 1325, and 1330). These depth maps are all generated based on the same stereo pair of images. The difference between these depth maps, however, is that different smoothness penalties have been applied.

Depth map 1305 is shown as having a smoothness penalty (P) equal to 0. As shown, depth map 1305 has high spatial information, and sharp depth discontinuities as there is no smoothness requirement on the stereo image matching. With this specific depth map 1305, the cost function is currently optimizing or considering only the data term. What this means is that for every pixel of the first texture image, the cost function is attempting to find a pixel in the second texture image that has the most similar color/intensity. In this case, the cost function is not considering the possibility that these two pixels might have very different disparities relative to their neighboring pixels. The result is this very noisy depth map 1305.

Depth map 1310 is relatively less noisy because a higher smoothness penalty was imposed on the cost function; here, the smoothness penalty was set to 5. Notice, the depth map 1310 is "flatter" or "smoother" than the depth map 1305. The result of applying a higher smoothness penalty is that the resulting depth map is relatively smoother than a scenario in which a smaller smoothness penalty is applied. By "smooth" it is meant that neighboring pixels in the texture images are required, or rather "motivated," to have a similar depth value. Further detail on this "motivation" aspect will be provided later.

Continuing the example, the depth map 1315 is relatively flatter than depth map 1310 because P has been set to a higher value. Similarly, depth map 1320 is flatter than the previous depth maps, and depth map 1325 is even more flat. If the smoothness penalty were set to a sufficiently high value, than all of the pixel disparities in the texture images will be so forcefully motivated to be the same value that the resulting depth map (i.e. depth map 1330) is entirely flat, or simply a plane. As a consequence, the depth map 1330 shows that all pixels have the same depth, whatever that depth may be. At this point, the smoothness costs are so high that the data term costs are completely gone and the end result is a disparity map (i.e. a depth map) where every pixel in the depth map has the same depth/disparity value.

From FIG. 13, one can observe how a relatively higher smoothness penalty results in a higher likelihood that all pixel disparities are modified to more closely align with one another. On the other hand, a relatively lower smoothness penalty results in a lower likelihood that all pixel disparities are modified to more closely align with one another.

Returning to FIG. 12, the embodiments intelligently select the smoothness penalty 1220 based on the SNR, or perhaps based on a proxy for the SNR of the texture images. That is, the embodiments choose the smoothness penalty 1220 in a way that is correlated with the SNR. What this means is that as the SNR degrades in quality, then the smoothness term 1210 takes over the data term 1215 (because of the higher smoothness penalty 1220 imposed against the smoothness term 1210) in terms of priority in the cost function 1200, and the resulting depth map will become smoother/flatter than it otherwise would have been. In the worst-case scenario, the depth map is entirely flat, as was shown in depth map 1330 of FIG. 13.

Figure 14:
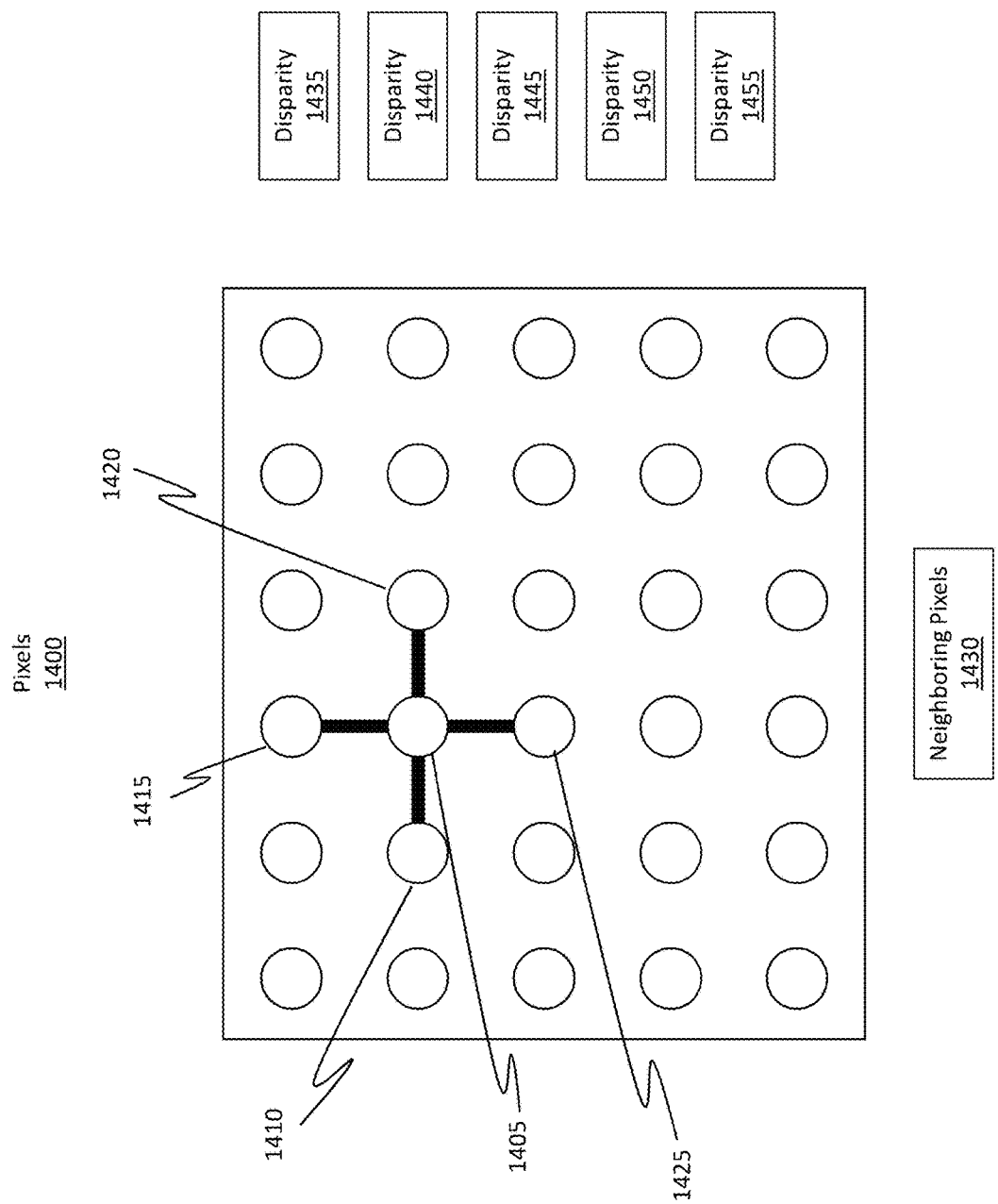
FIG. 14 illustrates how smoothing out disparities between any one pixel may also impact the disparities of other pixels.

To understand how the smoothness penalty 1220 influences the smoothness term 1210, it is beneficial to understand how the smoothness term 1210 operates. In particular, the smoothness term 1210 is defined as the disparity relationship between pairs of neighboring pixels in the cost function 1200. FIG. 14 is illustrative.

FIG. 14 shows a set of pixels 1400 that are included in a texture image (e.g., either one of the first texture image 1005 or the second texture image 1010 of FIG. 10). The set of pixels 1400 includes pixel 1405, 1410, 1415, 1420, and 1425. Pixels 1410, 1415, 1420, and 1425 are considered neighboring pixels 1430 relative to pixel 1405 in that those pixels are adjacent to pixel 1405.

The pixels 1400 are included in one of the stereo pair of images that were discussed earlier. Although not shown in FIG. 14, there is a second image included in the pair of images. Each of pixels 1405 through 1425 has a corresponding disparity associated with it, which disparity was computed in the manner described earlier (e.g., pixel 1405 may represent common pixel 1030 in FIG. 10 and there may be another pixel corresponding to common pixel 1035, the disparity is calculated based on these two pixels). For instance, pixel 1405 is associated with disparity 1435; pixel 1410 is associated with disparity 1440; pixel 1415 is associated with disparity 1445; pixel 1420 is associated with disparity 1450; and pixel 1425 is associated with disparity 1455.

What the smoothness penalty does is that it operates to motivate the disparities between neighboring pixels to have the same or similar values. For instance, suppose disparity 1435 for pixel 1405 had the value of 5, and the disparity 1440 for pixel 1410 had a value of 10. The smoothness term would attempt to cause these two values to more closely match one another by imposing additional cost to the cost function in terms of the smoothness penalty. The higher the penalty, the higher the cost and thus the more motivation to modify the disparities to be the same or similar. Further details on this matching aspect will be provided later.

It should be noted, however, that the motivation is performed for every pair of neighboring pixels. The result, therefore, is that motivating any one pixel in a pair of pixels to have a disparity similar to the other pixel in the pair will have a dramatic or rolling effect. That is, modifying one pixel's disparity may potentially modify all other pixel disparities in the texture image because the disparities will all be made at least partially dependent on one another as a result of the smoothness penalty.

Figure 15:
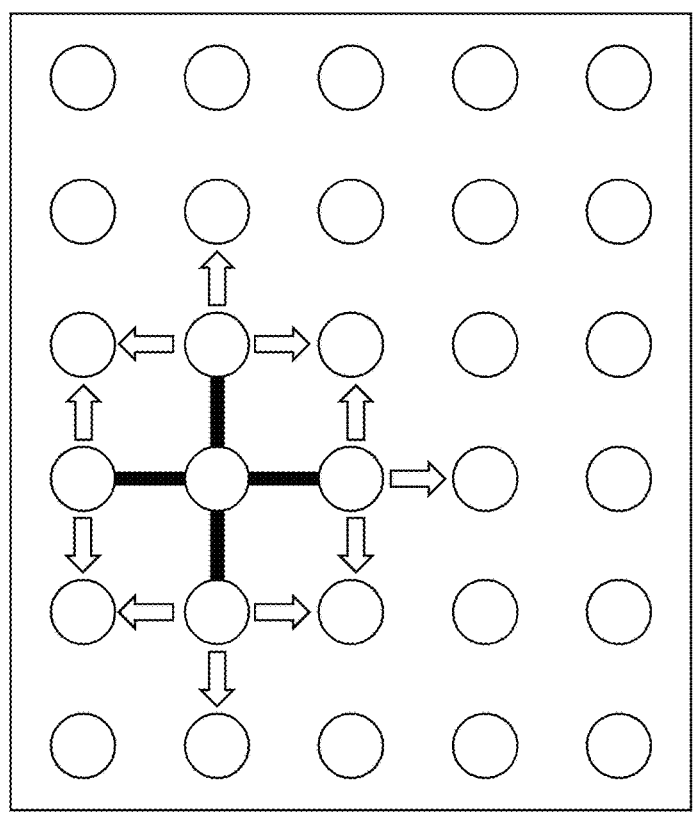
FIG. 15 illustrates a so-called "Knock-On Effect" in which smoothing pixel disparities impacts the disparities of the other pixels.

Such a phenomenon is referred to as a knock-on effect and is generally illustrated in FIG. 15, as shown by the knock-on effect 1500. To clarify, modifying the disparity of any one pixel causes the knock-on effect 1500 in that the disparities of all other pixels in the texture image may also be impacted and potentially modified as well. An example is similar to that of a fish net. Pulling up one interconnection of the fishnet has an impact on all the other interconnections in that the other interconnections may also be lifted up some amount (e.g., a butterfly effect). Accordingly, if the disparity of one pixel (e.g., perhaps in the top left corner of the image) is changed, that change could in theory influence even the bottom right pixel of the texture image because all of the pixels are connected to each other.

Returning to FIG. 12, the embodiments intelligently select the smoothness penalty 1220 in an effort to achieve an improved depth map, where selecting the smoothness penalty 1220 is now dependent on the SNR present in one or more of the texture images. Effectively, as the SNR gets worse, the system gradually falls back to a world that consists of smooth or flat depth values. Notably, applying the smoothness penalty 1220 is performed in the following manner: (1) if a pair of neighboring pixels have the same disparity, then the cost that is imposed is zero whereas (2) if the disparities are different, then the smoothness penalty 1220 is imposed in an effort to motivate the disparities to be smooth or flat.

FIG. 12 illustrates this concept in the following manner. Specifically, if the disparities are the same, then there is no additional cost 1225 introduced into the cost function 1200 by the smoothness term 1210. On the other hand, if the disparities are different, there is a cost 1225 that is applied in the form of the smoothness penalty 1220. As a result of imposing the smoothness penalty 1220, the disparities are motivated to change, as shown by the motivation for change 1230. Notably, the disparities are not strictly required to change, as shown by the "x" near the strictly forced change 1235. In this regard, the smoothness penalty 1220 effectively increases the cost 1225 of the cost function 1200 when disparities between neighboring pixels are different.

In selecting which disparity value to use when there exists a difference in disparity between neighboring pixels, the embodiments perform a balance operation 1240 in which the cost function 1200 attempts to optimize (e.g., as shown by optimization(s) 1245) both the smoothness term 1210 and the data term 1215. That is, although the smoothness penalty 1220 is being exercised or imposed against the smoothness term 1210, the data term 1215 is still being relied on by the cost function 1200, at least until such time as the smoothness penalty 1220 becomes so high that the smoothness term 1210 entirely overcomes the data term 1215. Accordingly, selecting which disparity value will be used is based on a balance operation 1240 in which both the smoothness term 1210 and the data term 1215 are considered and attempted to be optimized. A simple averaging operation is typically not performed because simply averaging values will typically not result in optimized terms.

By way of additional clarification, if only the smoothness term 1210 were optimized, then the resulting depth map will be entirely flat and the color intensities would not match up with regard to the data term 1215. In contrast, if only the data term 1215 were optimized, then the resulting depth map would also produce a wrong result (e.g., as shown by depth map 1305 of FIG. 13) because common color intensities would be matched up, but the resulting pixels may not have the correct depth. As such, the embodiments balance the optimization of both of these terms. Optimizations for any one disparity or group of disparities also influences the resulting depth pixels of the entire depth map because of the knock-on effect described earlier.

With that in mind, the disclosed embodiments operate to smooth the resulting depth map based on the SNR. By selectively imposing, modifying, altering, or selecting the smoothness penalty 1220, the smoothness term 1210 motivates or influences the disparity for every pixel in a texture image to correspond to the disparities of that pixel's four neighboring pixels. The higher the smoothness penalty 1220, the more linkage or influence will be exerted in motivating disparities to be the same, thereby flattening the resulting depth map. A lower smoothness penalty 1220 results in lesser amounts of flattening.

In some embodiments, a smoothness penalty function 1250 is used to determine which smoothness penalty 1220 is to be imposed against the smoothness term 1210. As recited above, this smoothness penalty function 1250 is based on the SNR that is identified in one or more of the texture images. In some cases, the smoothness penalty function 1250 is a linear relationship between the smoothness penalty 1220 and the SNR, where, as the SNR gets worse, the smoothness penalty 1220 is increased in a linear manner. In some cases, the smoothness penalty function 1250 can be computed by 1/SNR.

In some cases, the smoothness penalty function 1250 provides a tiered approach based on ranges of the SNR. For instance, if the SNR is between an "x" lower threshold and a "y" upper threshold, then a particular smoothness penalty 1220 is applied. Similarly, if the SNR is between a "y" lower threshold (which was previously the upper threshold for the previous tier or step) and a "z" upper threshold, then a different smoothness penalty 1220 is applied. In this manner, multiple ranges or tiers of SNR values may be determined, and a different smoothness penalty 1220 may be applied to each respective tier.

Accordingly, a predetermined function (e.g., smoothness penalty function 1250) may be used to determine which smoothness penalty is to be imposed against the smoothness term of the cost function. The predetermined function may be any one of:

(i) A linear function linearly relating the smoothness penalty to the SNR.

(ii) An inverse relationship function in which the smoothness penalty is inversely proportional to the SNR.

(iii) An SNR threshold that is reached based on the SNR (e.g., if the SNR exceeds the SNR threshold, then a smoothness penalty may be applied based on the threshold).

(iv) A plurality of tiered SNR thresholds, where different smoothness penalties are imposed against the smoothness term for each respective tiered SNR threshold included in the plurality of tiered SNR thresholds.

In some cases, the smoothness penalty 1220 may also be influenced based on previous smoothness penalty(s) 1255. For instance, depth maps used for parallax correction are often generated based on a pose of the HMD changing. Because the pose changes frequently, it is often the case that numerous new depth maps are being created. The embodiments are able to iteratively determine whether a previous smoothness penalty was sufficient to flatten out the depth map. If that smoothness penalty was not sufficient to achieve a threshold level of flattening (i.e. the depth map was still not sufficiently accurate), then the embodiments can modify (e.g., increase) the smoothness penalty for the next iteration until an acceptable level of flattening has been achieved. Accordingly, the process of selectively computing the smoothness penalty to be imposed against the smoothness term of the cost function may be further based on one or more previous smoothness terms used when computing one or more previous depth maps.

The disclosed embodiments are able to use any type of machine learning or automata learning in selecting the smoothness penalty 1220 and in utilizing the previous smoothness penalty(s) 1255. Generally, automata learning is a type of machine learning technique in which a current process or action is performed based on a set of previous actions or experiences that were performed. In some cases, automata learning is a type of reinforcement learning and is based on various different states or statuses of data. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Definition/Meaning for SNR

In some cases, a SNR may be considered when determining or selecting the smoothness penalty. As discussed earlier, SNR should be interpreted broadly to cover numerous different implementations, including a SNR based on a set of texture images, a SNR based on the quality of the stereo matching, or even a proxy used in place of an actual SNR. FIG. 1600 shows how SNR 1600 may be implemented in a variety of different forms, including a computed form or proxy form. In actuality, numerous different types of proxies may be used. For instance, the proxy for SNR 1600 may include a first proxy 1605 that may be dependent on two factors, including a first factor 1605A that considers a number of raw gray level counts that are included in a histogram of one or more of the texture images. This first factor 1605A may (but not necessarily, as reflected by the dotted box) also be considered in combination with a second factor 1605B that considers an estimated ambient light level of the environment. Estimating the ambient light levels may be performed in numerous ways, including analyzing the texture images to determine the ambient light levels, using a sensor to measure the light levels, and so forth.

With regard to the histogram, an example will be helpful. Suppose there is a 10-bit, or a 12-bit, or perhaps even a 14-bit gray level in an image. The embodiments are able to create a bin for each of the different bit gray levels included within the image and generate a histogram based on these bins. If the histogram reflects that a large number of the gray levels are near the bottom of the histogram, then that would indicate a high likelihood that the SNR is poor.

The proxy for SNR 1600 may also include a second proxy 1610 based on the confidence levels or reliability levels from a previously generated confidence map. That is, it is often the case that when a depth map is generated, that depth map is associated with a confidence map indicating levels of confidence regarding the depths included in the depth map. Higher levels of confidence indicate a higher likelihood that the depths are correct while lower levels of confidence indicate a higher likelihood of error in the depths. If the confidence map reflects lower confidence values, then it may be the case that the reason for those lower confidence values is that the SNR is poor. As a result, the confidence map may indirectly indicate the SNR.

A third proxy 1615 is the number of previously filtered pixels. When generating a depth map, sometimes neighboring pixels whose disparities satisfy a difference threshold or that failed to match with another pixel may simply be filtered out from consideration when generating the depth map. The reason these disparities may exist may be due to the SNR. As such, identifying how many pixels were previously filtered out from consideration when previous depth maps were computed can act as a proxy for the SNR.

A fourth proxy 1620 is related to the settings of the cameras used to generate the texture images. Specifically, the fourth proxy 1620 may be the gain level of the camera system. For instance, once a certain gain level is reached, the SNR decreases substantially. As such, the gain level of the camera system can serve as a proxy for the SNR.

Figure 16:
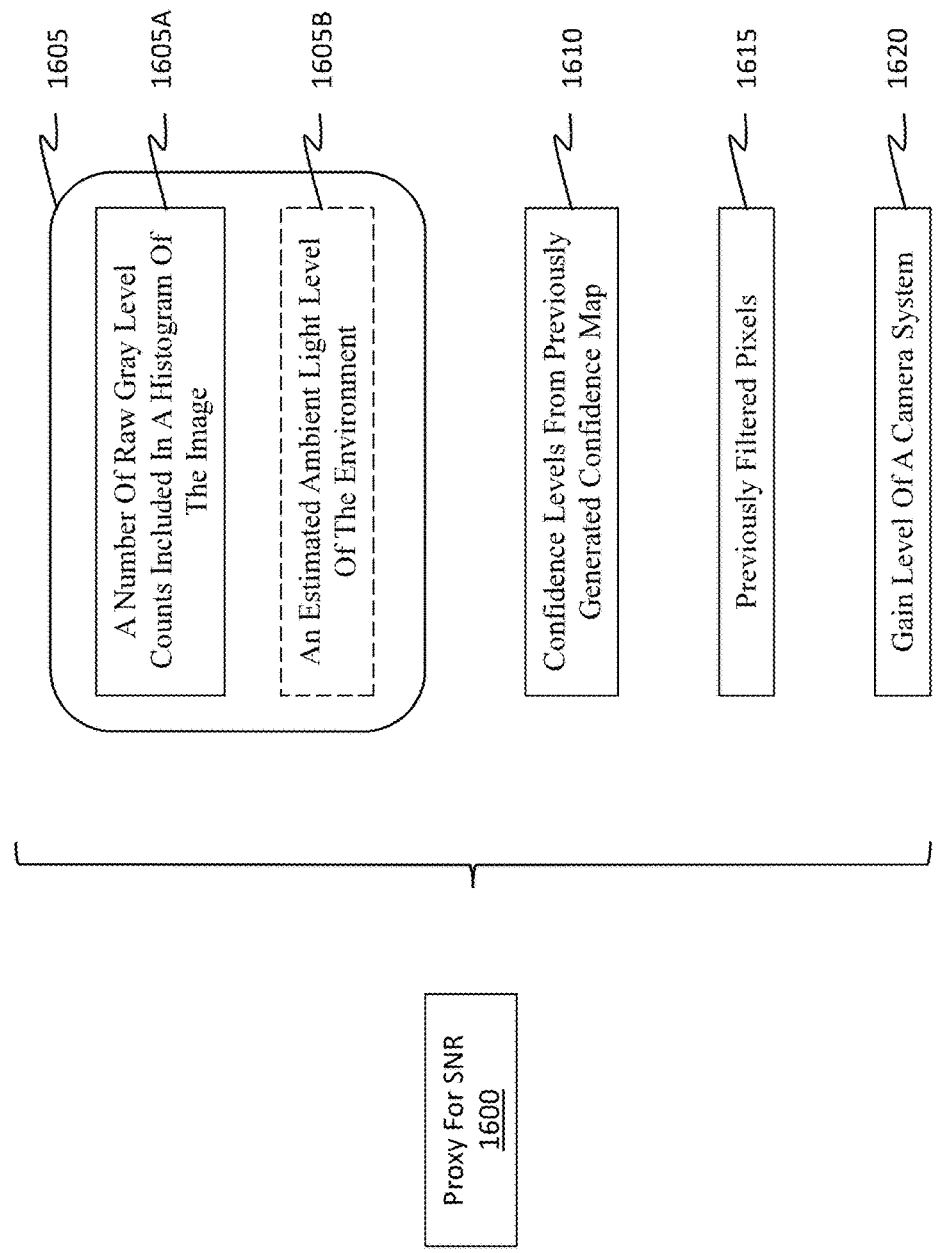
FIG. 16 illustrates how other factors may be used as a proxy for the SNR to determine which smoothness penalty to use.

Another proxy could simply be the smoothness or flatness of a previous depth map. If the smoothness is identified as being below an established threshold, then it may be the case that the SNR is poor and additional smoothing should be imposed for subsequent depth maps. Accordingly, with reference back to FIG. 12, selecting the smoothness penalty 1220 may be based either on the SNR directly or it may be based on a proxy for the SNR. Any proxy for the SNR may be considered, including the proxies discussed in connection with FIG. 16.

Parallax Correction

Figure 17:
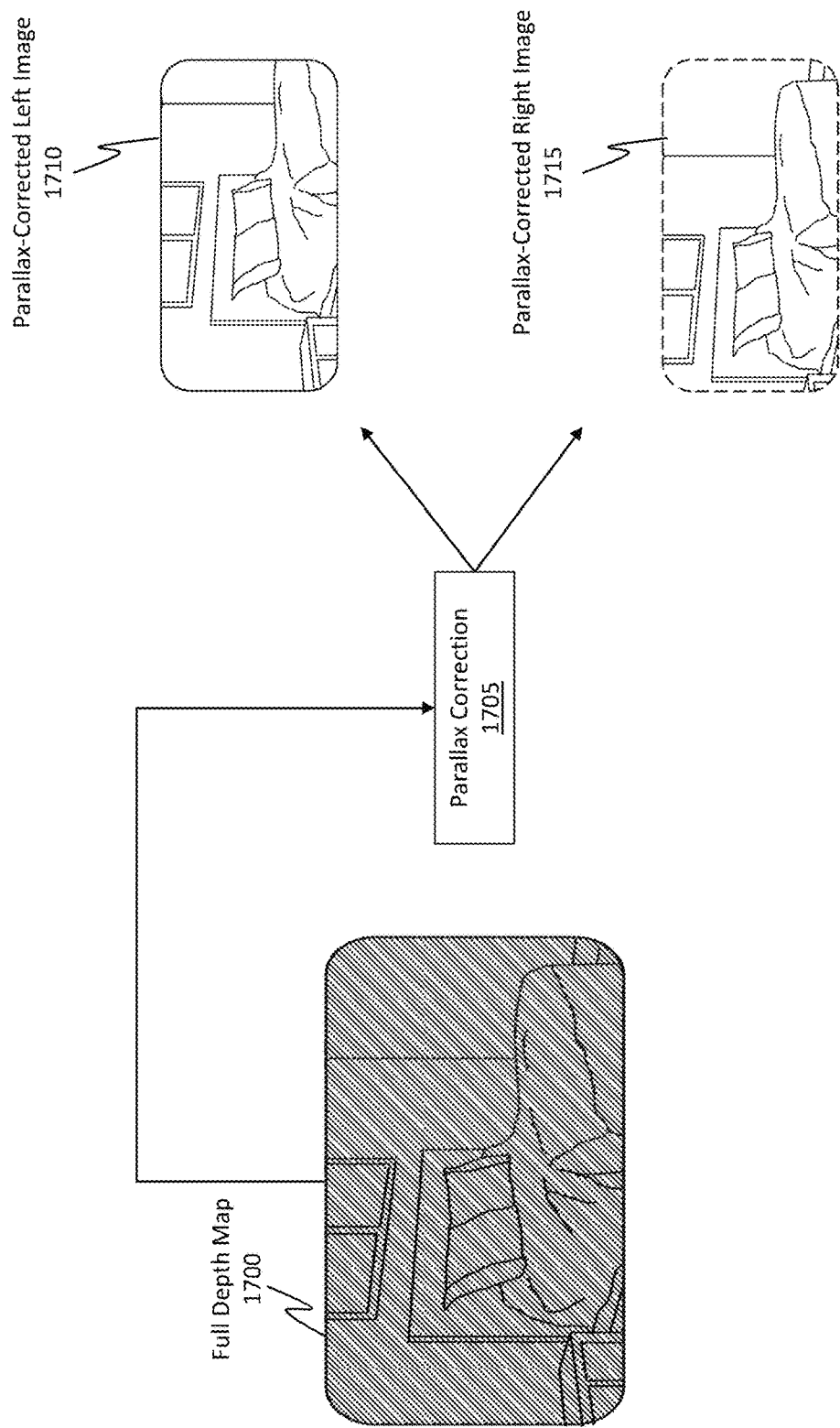
FIG. 17 illustrates how the resulting depth map may then be used to perform parallax correction.

FIG. 17 shows how a full depth map 1700, which is representative of the depth maps discussed thus far, can then be used to perform parallax correction 1705. That is, full depth map 1700 may be a depth map whose corresponding texture images originally had a poor SNR. The embodiments have performed the above-described operations to impose a smoothness penalty to thereby flatten the resulting depth map (i.e. the full depth map 1700). By performing the parallax correction 1705, it is possible to generate a parallax-corrected left image 1710 and a parallax-corrected right image 1715 in the manner discussed in connection with FIGS. 2 and 3.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 18:
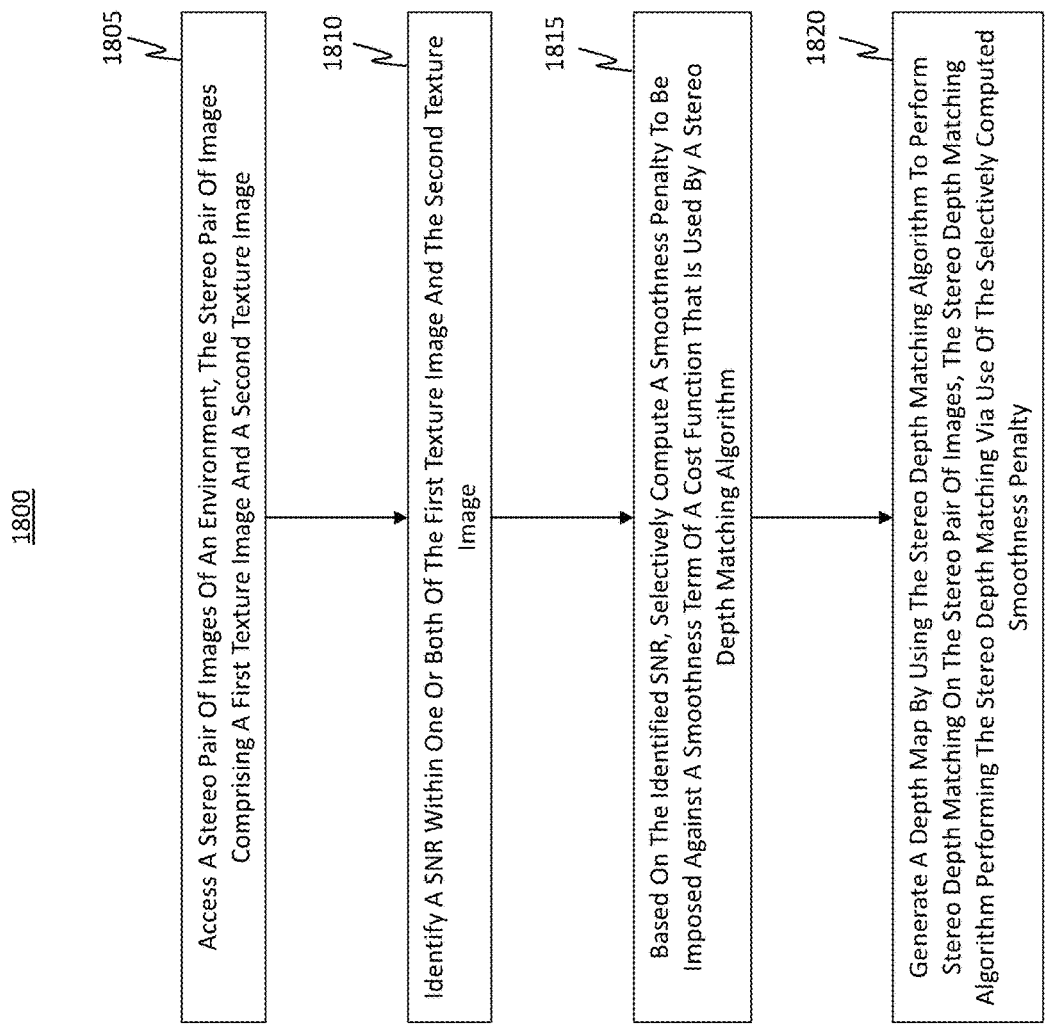
FIG. 18 illustrates a flow chart of an example method for improving how depth maps are generated.

FIG. 18 illustrates a flowchart of an example method 1800 configured to facilitate improved depth map generation. These improvements are achieved by computing a smoothness penalty (e.g., the smoothness penalty 1220 of FIG. 12) to be imposed against a smoothness term (e.g., the smoothness term 1210) of a cost function (e.g., the cost function 1200). As described earlier, the cost function also includes a data term (e.g., the data term 1215), and the cost function is used when a stereo depth matching algorithm (e.g., stereo depth matching algorithm 1205) generates a depth map. Beneficially, these computations may be based on a detected signal to noise ratio (SNR) of texture images (e.g., the first texture image 1005 and the second texture image 1010 of FIG. 10) used by the stereo depth matching algorithm to generate the depth map. Method 1800 may be performed by a computing system, including an HMD that has a display.

Initially, method 1800 includes an act (act 1805) of accessing a stereo pair of images of an environment. Here, the stereo pair of images comprise a first texture image and a second texture image, as was described in FIG. 10. Any type of camera system may have been used to generate these texture images. In some cases, one camera type may have been used to generate the first texture image and a second camera type may have been used to generate the second texture image. In some cases, different conditions may be been detected, which conditions were the trigger for generating the images. For instance, the cameras may be on an HMD, and the HMD may have shifted pose. This shift in pose may be the triggering reason as to why the images are obtained and accessed.

Method 1800 also includes an act (act 1810) of identifying a SNR within one or both of the first texture image and the second texture image. Often, the SNR in both of the images will be substantially the same because both images are capturing similar areas of an environment. Sometimes, however, the SNRs may be different due to differences in the cameras. In some cases, the SNR is based on only one image while in other cases the SNR may be an average of the SNRs of the two images combined. Often, the SNR is at least partially influenced by the ambient light conditions.

In some implementations, the SNR recited in act 1810 is implemented in a proxy form acting as a substitute for an actual SNR. The proxy may be any of the proxies listed earlier in connection with FIG. 16 or may be based on the information listed earlier, including, but certainly not limited to (i) a number of raw gray level counts included in a histogram of the image in combination with (ii) an estimated ambient light level of the environment. In some cases, the proxy is a set of confidence levels included within a previously generated confidence map. This previously generated confidence map may be included as a part of a previously generated depth map that was previously computed using the stereo depth matching algorithm. Here, the confidence levels indicate confidences that disparities of common pixels are accurate. In some cases, the proxy is an indication regarding how many pixels were previously filtered out from consideration by the stereo depth matching algorithm when the stereo depth matching algorithm computed a previous depth map. In some cases, the proxy is based on a gain level of a camera system that generated the stereo pair of images.

In any event, based on the identified SNR (or perhaps the proxy), there is an act (act 1815) of selectively computing a smoothness penalty to be imposed against a smoothness term of a cost function that is used by a stereo depth matching algorithm. FIG. 12 was representative of this operation.

Method 1800 also includes an act (act 1820) of generating a depth map by using the stereo depth matching algorithm to perform stereo depth matching on the stereo pair of images. The stereo depth matching algorithm performs the stereo depth matching via use of the selectively computed smoothness penalty. FIG. 12 was also representative of this operation. By selectively modifying, altering, selecting, or determining the smoothness penalty in the manner described in this disclosure, the embodiments are able to produce flatter depth maps. For instance, the depth maps shown in FIG. 13 transition from a non-flat depth map (i.e. depth map 1305) to an entirely flat depth map (i.e. depth map 1330). When poor SNR is present in the texture images, it is highly beneficial to modify the smoothness penalty so as to produce a flatter depth map. Refraining from doing so (when a poor SNR is present) will cause the resulting depth map to be obscure and grainy, as shown by some of the depth maps in FIG. 13.

In some cases, the method 1800 may continue with additional acts, though these acts are not illustrated in FIG. 18. For instance, the method 1800 may further include applying parallax correction using the depth map. Additionally, the method 1800 may include generating parallax-corrected images based on the depth map and then displaying these images to a user on the display of the HMD.

Figure 19:
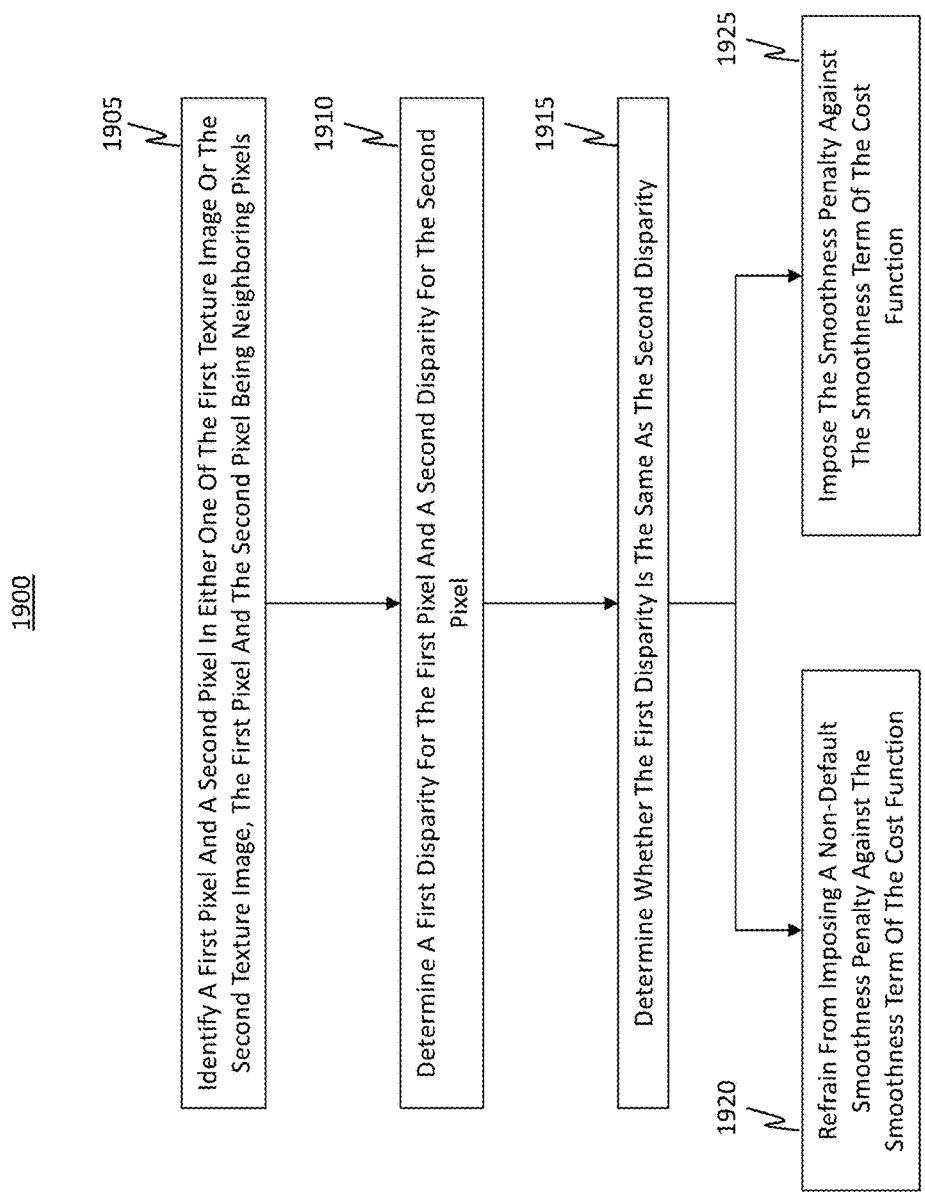
FIG. 19 illustrates another flow chart of an example method for determining how to apply the smoothness penalty.

In some embodiments, a corresponding disparity is determined for each of at least some common pixels existing between the first texture image and the second texture image. In this case, the method 1900 of FIG. 19 illustrates a few operations that may be performed when using the selectively computed smoothness penalty.

For instance, method 1900 shows an act (act 1905) of identifying a first pixel and a second pixel in either one of the first texture image or the second texture image. The first pixel and the second pixel are neighboring pixels. By way of example, the first pixel may be the pixel 1405 of FIG. 14 and the second pixel may be any one of pixels 1410, 1415, 1420, and 1425.

There is then an act (act 1910) of determining a first disparity for the first pixel and a second disparity for the second pixel. For instance, the first disparity may be disparity 1435, which corresponds to pixel 1405 in FIG. 14, and the second disparity may be any one of the disparities 1440, 1445, 1450, and 1455, depending on which pixel was used as the second pixel.

There is then an act (act 1915) of determining whether the first disparity is the same as the second disparity. Upon a condition in which the first disparity is the same as the second disparity, the method 1900 includes an act (act 1920) of refraining from imposing a non-default smoothness penalty against the smoothness term of the cost function. Typically, a default smoothness penalty is applied. So, this method act imposes only the default smoothness penalty and refrains from imposing a different smoothness penalty. In some embodiments, at least a default smoothness penalty is always imposed against the smoothness term.

On the other hand, upon a condition in which the first disparity is different from the second disparity, there is an act (act 1925) of imposing the selectively computed smoothness penalty against the smoothness term of the cost function. Consequently, one of the first disparity or the second disparity is selected for possible modification to potentially cause the one of the first disparity or the second disparity to be modified to more closely correspond to the other one of the first disparity or the second disparity. For instance, the embodiments are able to select a smoothness penalty to be imposed against the smoothness term, where this selected smoothness penalty is designed to flatten out the resulting depth map.

The embodiments further perform a balance operation to balance optimizing both the smoothness term and the data term, as was described previously in connection with FIG. 12. By way of additional clarification, when determining how to modify the one of the first disparity or the second disparity to more closely correspond to the other one of the first disparity or the second disparity, the embodiments perform a balance operation to balance both an optimization of the smoothness term and an optimization of the data term of the cost function.

Furthermore, when the disparities are different, the process of modifying the first or second disparity is not strictly enforced but rather is motivated to be enforced by increasing an overall cost associated with the cost function. A knock-on effect occurs between pixels in either one of the first texture image or the second texture image when either one of the first disparity or the second disparity is modified. This knock-on effect occurs as a result of imposing the smoothness penalty against the smoothness term of the cost function. Accordingly, imposing a non-default smoothness penalty may be performed when differences in disparities between neighboring pixels occurs.

Example Computer/Computer Systems

Attention will now be directed to FIG. 20 which illustrates an example computer system 2000 that may include and/or be used to perform any of the operations described herein. Computer system 2000 may take various different forms. For example, computer system 2000 may be embodied as a tablet 2000A, a desktop or a laptop 2000B, a wearable device such as an HMD 2000C (which is representative of the HMDs discussed herein), a mobile device, or any other type of standalone device, as represented by the ellipsis 2000D. Computer system 2000 may also be a distributed system that includes one or more connected computing components/devices that are in communication with computer system 2000.

In its most basic configuration, computer system 2000 includes various different components. FIG. 20 shows that computer system 2000 includes one or more processor(s) 2005 (aka a "hardware processing unit") and storage 2010. Although not illustrated, the computer system 2000 may include any of the features recited in connection with FIGS. 2 and 3, as well as any other features recited in this disclosure. It should be noted how none of the disclosed features are mutually exclusive and that any feature recited herein may be combined with any other feature recited herein.

Regarding the processor(s) 2005, it will be appreciated that the functionality described herein can be performed, at least in part, by one or more hardware logic components (e.g., the processor(s) 2005). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

Any type of depth detection may be performed by the computer system 2000 and by the scanning sensor(s). Examples include, but are not limited to, stereoscopic depth detection (both active illumination (e.g., using a dot illuminator), structured light illumination (e.g., 1 actual camera, 1 virtual camera, and 1 dot illuminator), and passive (i.e. no illumination)), time of flight depth detection (with a baseline between the laser and the camera, where the field of view of the camera does not perfectly overlap the field of illumination of the laser), range finder depth detection, or any other type of range or depth detection.

Machine learning (ML) may be implemented as a specific processing unit (e.g., a dedicated processing unit as described earlier) configured to perform one or more specialized operations for the computer system 2000. As used herein, the terms "executable module," "executable component," "component," "module," "model," or "engine" can refer to hardware processing units or to software objects, routines, or methods that may be executed on computer system 2000. The different components, modules, engines, models, and services described herein may be implemented as objects or processors that execute on computer system 2000 (e.g. as separate threads). ML models and/or the processor(s) 2005 can be configured to perform one or more of the disclosed method acts or other functionalities.

Storage 2010 may be physical system memory, which may be volatile, non-volatile, or some combination of the two. The term "memory" may also be used herein to refer to non-volatile mass storage such as physical storage media. If computer system 2000 is distributed, the processing, memory, and/or storage capability may be distributed as well.

Storage 2010 is shown as including executable instructions (i.e. code 2015). The executable instructions represent instructions that are executable by the processor(s) 2005 (or perhaps even a ML model) of computer system 2000 to perform the disclosed operations, such as those described in the various methods.

The disclosed embodiments may comprise or utilize a special-purpose or general-purpose computer including computer hardware, such as, for example, one or more processors (such as processor(s) 2005) and system memory (such as storage 2010), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2000 may also be connected (via a wired or wireless connection) to external sensors (e.g., one or more remote cameras) or devices via a network 2020. For example, computer system 2000 can communicate with any number devices or cloud services to obtain or process data. In some cases, network 2020 may itself be a cloud network. Furthermore, computer system 2000 may also be connected through one or more wired or wireless networks 2020 to remote/separate computer systems(s) that are configured to perform any of the processing described with regard to computer system 2000.

A "network," like network 2020, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2000 will include one or more communication channels that are used to communicate with the network 2020. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system configured to facilitate improved depth map generation by computing a smoothness penalty to be imposed against a smoothness term of a cost function, which also includes a data term and which is used when a stereo depth matching algorithm generates a depth map, said computing being based on a detected signal to noise ratio (SNR) of texture images used by the stereo depth matching algorithm to generate the depth map, the computer system comprising:

one or more processors; and
   one or more computer-readable physical hardware storage devices that store instructions that are executable by the one or more processors to cause the computer system to at least:
      access a stereo pair of images of an environment, the stereo pair of images comprising a first texture image and a second texture image;
      identify a SNR within one or both of the first texture image and the second texture image;
      based on the identified SNR, selectively compute a smoothness penalty to be imposed against a smoothness term of a cost function that is used by a stereo depth matching algorithm; and
      generate a depth map by using the stereo depth matching algorithm to perform stereo depth matching on the stereo pair of images, wherein the stereo depth matching algorithm performs the stereo depth matching via use of the selectively computed smoothness penalty.

2. The computer system of claim 1, wherein a corresponding disparity is determined for each of at least some common pixels existing between the first texture image and the second texture image, and wherein using the selectively computed smoothness penalty includes:
identifying a first pixel and a second pixel in either one of the first texture image or the second texture image, the first pixel and the second pixel being neighboring pixels;
determining a first disparity for the first pixel and a second disparity for the second pixel;
determining whether the first disparity is the same as the second disparity;
upon a condition in which the first disparity is the same as the second disparity, refraining from imposing a non-default smoothness penalty against the smoothness term of the cost function; and
upon a condition in which the first disparity is different from the second disparity, imposing the smoothness penalty against the smoothness term of the cost function such that one of the first disparity or the second disparity is selected for possible modification to potentially cause the one of the first disparity or the second disparity to be modified to more closely correspond to the other one of the first disparity or the second disparity.

3. The computer system of claim 2, wherein, when determining how to modify the one of the first disparity or the second disparity to more closely correspond to the other one of the first disparity or the second disparity, a balance operation is performed to balance both an optimization of the smoothness term and an optimization of the data term of the cost function.

4. The computer system of claim 2, wherein, upon the condition in which the first disparity is different from the second disparity, modifying the one of the first disparity or the second disparity is not strictly enforced but rather is motivated to be enforced by increasing an overall cost associated with the cost function.

5. The computer system of claim 2, wherein a knock-on effect occurs between pixels in either one of the first texture image or the second texture image when either one of the first disparity or the second disparity is modified as a result of imposing the smoothness penalty against the smoothness term of the cost function.

6. The computer system of claim 1, wherein the SNR is at least partially influenced by ambient light conditions or, alternatively, is based on a set of thermal images reflecting isothermal conditions of the environment.

7. The computer system of claim 1, wherein the SNR is evaluated based on (i) a number of raw gray level counts included in a histogram of the image in combination with (ii) an estimated ambient light level of the environment.

8. The computer system of claim 1, wherein the SNR is evaluated based on the previously generated confidence map being included as a part of a previously generated depth map that was previously computed using the stereo depth matching algorithm, and
wherein the confidence levels indicate confidences that disparities of common pixels are accurate.

9. The computer system of claim 1, wherein the SNR is evaluated based on an indication regarding how many pixels were previously filtered out from consideration by the stereo depth matching algorithm when the stereo depth matching algorithm computed a previous depth map.

10. The computer system of claim 1, wherein a predetermined function is used to determine which smoothness penalty is to be imposed against the smoothness term of the cost function, and
wherein the predetermined function is one of:
a linear function linearly relating the smoothness penalty to the SNR; or
an inverse relationship function in which the smoothness penalty is inversely proportional to the SNR; or
a SNR threshold being reached based on the SNR; or
a plurality of tiered SNR thresholds, where different smoothness penalties are imposed against the smoothness term for each respective tiered SNR threshold included in the plurality of tiered SNR thresholds.

11. A method for facilitating improvements in depth map generation by computing a smoothness penalty to be imposed against a smoothness term of a cost function, which also includes a data term and which is used when a stereo depth matching algorithm generates a depth map, said computing being based on a detected signal to noise ratio (SNR) of texture images used by the stereo depth matching algorithm to generate the depth map, said method comprising:
accessing a stereo pair of images of an environment, the stereo pair of images comprising a first texture image and a second texture image;
identifying a SNR within one or both of the first texture image and the second texture image;
based on the identified SNR, selectively computing a smoothness penalty to be imposed against a smoothness term of a cost function that is used by a stereo depth matching algorithm; and
generating a depth map by using the stereo depth matching algorithm to perform stereo depth matching on the stereo pair of images, wherein the stereo depth matching algorithm performs the stereo depth matching via use of the selectively computed smoothness penalty.

12. The method of claim 11, wherein the stereo depth matching algorithm is a semi-global matching (SGM) stereo matching algorithm.

13. The method of claim 11, wherein the SNR is at least partially influenced by ambient light conditions.

14. The method of claim 11, wherein a relatively higher smoothness penalty results in a higher likelihood that all pixel disparities are modified to more closely align with one another while a relatively lower smoothness penalty results in a lower likelihood that all pixel disparities are modified to more closely align with one another.

15. The method of claim 11, wherein the SNR is a proxy acting as a substitute for an actual SNR, and wherein the proxy is based on a gain level of a camera system that generated the stereo pair of images.

16. The method of claim 11, wherein selectively computing the smoothness penalty to be imposed against the smoothness term of the cost function is further based on a previous smoothness term used when computing a previous depth map.

17. The method of claim 11, wherein a default smoothness penalty is always imposed against the smoothness term.

18. The method of claim 11, wherein the method further includes applying parallax correction using the depth map.

19. The method of claim 11, wherein the first texture image is generated by a first camera and the second texture image is generated by a second camera, and wherein the first camera is one camera selected from a group of cameras comprising a visible light camera, a low light camera, or a thermal imaging camera, and wherein the second camera is also one camera selected from the group of cameras.

20. A head-mounted device (HMD) configured to facilitate improved depth map generation by computing a smoothness penalty to be imposed against a smoothness term of a cost function, which also includes a data term and which is used when a stereo depth matching algorithm generates a depth map, said computing being based on a detected signal to noise ratio (SNR) of texture images used by the stereo depth matching algorithm to generate the depth map, the HMD comprising:

a display;

one or more processors; and one or more computer-readable physical hardware storage devices that store instructions that are executable by the one or more processors to cause the HMD to at least:

access a stereo pair of images of an environment, the stereo pair of images comprising a first texture image and a second texture image;

identify a SNR within one or both of the first texture image and the second texture image;

based on the identified SNR, selectively compute a smoothness penalty to be imposed against a smoothness term of a cost function that is used by a stereo depth matching algorithm; and generate a depth map by using the stereo depth matching algorithm to perform stereo depth matching on the stereo pair of images, wherein the stereo depth matching algorithm performs the stereo depth matching via use of the selectively computed smoothness penalty.

\* \* \* \* \*